US012623181B2

(12) United States Patent (10) Patent No.: US 12,623,181 B2
Edlund et al. (45) Date of Patent: May 12, 2026

(54) HYDROGEN PURIFICATION DEVICES

(71) Applicant: Element 1 Corp, Bend, OR (US)

(72) Inventors: David J. Edlund, Bend, OR (US);
Robert Todd Studebaker, Bend, OR
(US)

(73) Assignee: Element 1 Corp, Bend, OR (US)

( * ) Notice: Subject to any disclaimer, the term of this
patent is extended or adjusted under 35
U.S.C. 154(b) by 529 days.

(21) Appl. No.: 18/328,494

(22) Filed: Jun. 2, 2023

(65) Prior Publication Data

US 2024/0399295 A1 Dec. 5, 2024

(51) Int. Cl.
*B01D 53/22* (2006.01)
(52) U.S. Cl.
CPC ........ *B01D 53/22* (2013.01); *B01D 2053/222*
(2013.01); *B01D 2256/16* (2013.01)
(58) Field of Classification Search
CPC .............. B01D 53/22; B01D 2053/222; B01D
2256/16
See application file for complete search history.

(56) References Cited

U.S. PATENT DOCUMENTS

| | | | |
|---|---|---|---|
| 2,151,329 A | 3/1939 | Page et al. | |
| 2,196,343 A | 4/1940 | Saltsman | |
| 2,196,463 A | 4/1940 | Holleran | |
| 3,154,920 A | 11/1964 | Nash et al. | |
| 3,415,634 A | 12/1968 | Dent et al. | |
| 3,421,871 A | 1/1969 | Davies et al. | |
| 3,586,621 A | 6/1971 | Pitchford et al. | |

| | | | |
|---|---|---|---|
| 3,608,610 A | 9/1971 | Greatorex et al. | |
| 3,642,460 A | 2/1972 | Thompson | |
| 3,737,291 A | 6/1973 | Lhonore et al. | |
| 3,761,382 A | 9/1973 | Hammond et al. | |

(Continued)

FOREIGN PATENT DOCUMENTS

| | | |
|---|---|---|
| CA | 2467012 A1 | 4/2001 |
| CN | 1384043 A | 12/2002 |

(Continued)

OTHER PUBLICATIONS

Edlund, David, "Methanol Fuel Cell Systems: Advancing Towards
Commercialization", Pan Stanford Publishing Pte. Ltd., Singapore,
2011, 199 pages.

(Continued)

*Primary Examiner* — Anthony Shumate
(74) *Attorney, Agent, or Firm* — Chernoff, Vilhauer LLP

(57) ABSTRACT

Hydrogen purification devices and their components are
disclosed. In some embodiments, the devices may include
feed frame(s) and/or permeate frame(s) each having at least
one elongate hole distinct and spaced from an open region,
at least one output aperture, and/or at least one input
aperture. The elongate hole may be disposed between the
open region and the at least one input aperture. The elongate
hole may be capable of receiving a portion of the mixed gas
stream that leaks from the open region and/or at least one
input conduit. The devices may additionally include gasket
frames having at least one notch in one or more edges of a
perimeter base. The notch may be in fluid communication
with a longitudinal end portion of the elongate hole. The
devices may further include first and second side plates that
collectively enclose a plurality of frames.

19 Claims, 15 Drawing Sheets

(56) References Cited

U.S. PATENT DOCUMENTS

| | | | | |
|---|---|---|---|---|
| 3,761,386 A | | 9/1973 | Smith | |
| 3,825,490 A | | 7/1974 | Vachuda | |
| 3,838,994 A | | 10/1974 | Aldridge | |
| 3,888,043 A | | 6/1975 | Child et al. | |
| 3,930,813 A | * | 1/1976 | Gessner | B01D 53/22 |
| | | | | 95/232 |
| 3,930,814 A | * | 1/1976 | Gessner | B01D 63/08 |
| | | | | 96/9 |
| 3,935,636 A | | 2/1976 | Mermelstein | |
| 3,979,190 A | * | 9/1976 | Hedman | C01B 13/0251 |
| | | | | 96/7 |
| 3,984,324 A | | 10/1976 | Wang | |
| 4,104,201 A | | 8/1978 | Banks et al. | |
| 4,124,478 A | | 11/1978 | Tsien et al. | |
| 4,319,978 A | | 3/1982 | Millman | |
| 4,345,555 A | | 8/1982 | Oshima et al. | |
| 4,472,176 A | | 9/1984 | Rubin | |
| 4,692,306 A | | 9/1987 | Minet et al. | |
| 4,702,312 A | | 10/1987 | Brown | |
| 4,887,556 A | | 12/1989 | Gladstone | |
| 4,896,636 A | | 1/1990 | Pfefferle | |
| 5,053,195 A | | 10/1991 | MacKay | |
| 5,112,527 A | | 5/1992 | Kobylinski | |
| 5,139,541 A | | 8/1992 | Edlund | |
| 5,146,881 A | | 9/1992 | Pfefferle | |
| 5,164,163 A | | 11/1992 | Aoki et al. | |
| 5,182,075 A | | 1/1993 | Gotoh et al. | |
| 5,217,506 A | | 6/1993 | Edlund et al. | |
| 5,259,870 A | | 11/1993 | Edlund | |
| 5,266,283 A | | 11/1993 | Friesen et al. | |
| 5,281,254 A | | 1/1994 | Birbara et al. | |
| 5,393,325 A | | 2/1995 | Edlund | |
| 5,464,466 A | * | 11/1995 | Nanaji | B01D 53/22 |
| | | | | 95/45 |
| 5,498,278 A | | 3/1996 | Edlund | |
| 5,536,405 A | | 7/1996 | Myrna et al. | |
| 5,580,476 A | | 12/1996 | Dam et al. | |
| 5,636,511 A | | 6/1997 | Pfefferle et al. | |
| 5,645,626 A | | 7/1997 | Edlund et al. | |
| 5,711,882 A | | 1/1998 | Hofmann et al. | |
| 5,782,960 A | | 7/1998 | Ogawa et al. | |
| 5,791,308 A | | 8/1998 | Carter et al. | |
| 5,861,137 A | | 1/1999 | Edlund | |
| 5,888,273 A | | 3/1999 | Buxbaum | |
| 5,904,754 A | | 5/1999 | Juda et al. | |
| 5,964,089 A | | 10/1999 | Murphy et al. | |
| 5,997,594 A | | 12/1999 | Edlund et al. | |
| 6,103,028 A | | 8/2000 | Juda et al. | |
| 6,136,222 A | | 10/2000 | Friesen et al. | |
| 6,152,995 A | | 11/2000 | Edlund | |
| 6,168,650 B1 | | 1/2001 | Buxbaum | |
| 6,171,574 B1 | | 1/2001 | Juda et al. | |
| 6,183,542 B1 | | 2/2001 | Bossard | |
| 6,183,543 B1 | | 2/2001 | Buxbaum | |
| 6,189,568 B1 | | 2/2001 | Bergum et al. | |
| 6,221,117 B1 | | 4/2001 | Edlund et al. | |
| 6,241,945 B1 | | 6/2001 | Owen | |
| 6,319,306 B1 | | 11/2001 | Edlund et al. | |
| 6,332,913 B1 | | 12/2001 | Breitschwedt et al. | |
| 6,368,742 B2 | | 4/2002 | Fisher et al. | |
| 6,375,906 B1 | | 4/2002 | Edlund et al. | |
| 6,376,113 B1 | | 4/2002 | Edlund et al. | |
| 6,383,670 B1 | | 5/2002 | Edlund et al. | |
| 6,402,818 B1 | | 6/2002 | Sengupta | |
| 6,419,728 B1 | | 7/2002 | Edlund | |
| 6,451,464 B1 | | 9/2002 | Edlund et al. | |
| 6,458,189 B1 | | 10/2002 | Edlund et al. | |
| 6,465,118 B1 | | 10/2002 | Dickman et al. | |
| 6,475,268 B2 | | 11/2002 | Thornton | |
| 6,494,937 B1 | | 12/2002 | Edlund et al. | |
| 6,495,277 B1 | | 12/2002 | Edlund et al. | |
| 6,511,521 B1 | | 1/2003 | Parchamazad | |
| 6,537,352 B2 | | 3/2003 | Edlund et al. | |
| 6,547,858 B1 | | 4/2003 | Edlund et al. | |
| 6,562,111 B2 | | 5/2003 | Edlund et al. | |
| 6,564,579 B1 | | 5/2003 | McCartney | |
| 6,569,227 B2 | | 5/2003 | Edlund et al. | |
| 6,596,057 B2 | | 7/2003 | Edlund et al. | |
| 6,616,841 B2 | | 9/2003 | Cho et al. | |
| 6,632,270 B2 | | 10/2003 | Edlund et al. | |
| 6,660,069 B2 | | 12/2003 | Sato et al. | |
| 6,667,128 B2 | | 12/2003 | Edlund | |
| 6,719,831 B2 | | 4/2004 | Edlund et al. | |
| 6,719,832 B2 | | 4/2004 | Edlund et al. | |
| 6,723,156 B2 | | 4/2004 | Edlund et al. | |
| 6,758,101 B2 | | 7/2004 | Valentine | |
| 6,767,389 B2 | | 7/2004 | Edlund et al. | |
| 6,783,741 B2 | | 8/2004 | Edlund et al. | |
| 6,811,908 B2 | | 11/2004 | Edlund et al. | |
| 6,818,335 B2 | | 11/2004 | Edlund et al. | |
| 6,824,593 B2 | | 11/2004 | Edlund et al. | |
| 6,835,481 B2 | | 12/2004 | Dickman et al. | |
| 6,858,341 B2 | | 2/2005 | Edlund | |
| 6,869,707 B2 | | 3/2005 | Edlund et al. | |
| 6,872,464 B2 | | 3/2005 | Hubner et al. | |
| 6,878,474 B2 | | 4/2005 | Dickman et al. | |
| 6,890,672 B2 | | 5/2005 | Dickman et al. | |
| 6,896,709 B1 | | 5/2005 | Han et al. | |
| 6,953,497 B2 | | 10/2005 | Edlund et al. | |
| 6,979,507 B2 | | 12/2005 | Edlund et al. | |
| 6,979,801 B2 | | 12/2005 | Okazaki et al. | |
| 6,994,927 B2 | | 2/2006 | Edlund et al. | |
| 7,005,113 B2 | | 2/2006 | Edlund et al. | |
| 7,008,708 B2 | | 3/2006 | Edlund et al. | |
| 7,022,395 B2 | | 4/2006 | Ackerman et al. | |
| 7,029,515 B2 | | 4/2006 | Krueger | |
| 7,033,641 B2 | | 4/2006 | Saijo et al. | |
| 7,052,530 B2 | | 5/2006 | Edlund et al. | |
| 7,063,047 B2 | | 6/2006 | Reinke et al. | |
| 7,101,421 B2 | | 9/2006 | Edlund et al. | |
| 7,135,048 B1 | | 11/2006 | Edlund et al. | |
| 7,147,677 B2 | | 12/2006 | Edlund | |
| 7,182,917 B2 | | 2/2007 | Krueger | |
| 7,195,663 B2 | | 3/2007 | Edlund et al. | |
| 7,201,783 B2 | | 4/2007 | Edlund | |
| 7,208,241 B2 | | 4/2007 | Edlund et al. | |
| 7,250,231 B2 | | 7/2007 | Edlund | |
| 7,258,946 B2 | | 8/2007 | Edlund | |
| 7,297,183 B2 | | 11/2007 | Edlund et al. | |
| 7,306,868 B2 | | 12/2007 | Arthur | |
| 7,341,609 B2 | | 3/2008 | DeVries | |
| 7,368,194 B2 | | 5/2008 | Dickman et al. | |
| 7,368,195 B2 | | 5/2008 | Edlund et al. | |
| 7,390,587 B2 | | 6/2008 | Dickman et al. | |
| 7,410,531 B2 | | 8/2008 | Edlund et al. | |
| 7,470,293 B2 | | 12/2008 | Edlund et al. | |
| 7,476,455 B2 | | 1/2009 | Edlund | |
| 7,485,381 B2 | | 2/2009 | Dickman et al. | |
| 7,601,302 B2 | | 10/2009 | Edlund et al. | |
| 7,632,321 B2 | | 12/2009 | Edlund | |
| 7,632,322 B2 | | 12/2009 | Edlund | |
| 7,641,795 B2 | | 1/2010 | Taylor et al. | |
| 7,659,019 B2 | | 2/2010 | Edlund | |
| 7,682,718 B2 | | 3/2010 | Dickman et al. | |
| 7,736,596 B2 | | 6/2010 | Edlund et al. | |
| 7,771,882 B2 | | 8/2010 | Edlund et al. | |
| 7,789,941 B2 | | 9/2010 | Edlund et al. | |
| 7,819,955 B2 | | 10/2010 | Edlund et al. | |
| 7,828,864 B2 | | 11/2010 | Edlund et al. | |
| 7,846,569 B2 | | 12/2010 | Edlund et al. | |
| 7,939,211 B2 | | 5/2011 | Edlund et al. | |
| 7,977,000 B2 | | 7/2011 | Edlund | |
| 7,981,172 B2 | | 7/2011 | Edlund et al. | |
| 7,985,510 B2 | | 7/2011 | Edlund et al. | |
| 8,021,446 B2 | | 9/2011 | Adams et al. | |
| 8,038,748 B2 | | 10/2011 | Edlund | |
| 8,057,575 B2 | | 11/2011 | Edlund et al. | |
| 8,133,626 B2 | | 3/2012 | Edlund et al. | |
| 8,226,751 B2 | | 7/2012 | Ishibe et al. | |
| 8,262,752 B2 | | 9/2012 | Popham | |
| 8,603,219 B2 | | 12/2013 | Edlund et al. | |
| 8,956,428 B2 | | 2/2015 | Carnell et al. | |
| 8,961,627 B2 | | 2/2015 | Edlund | |
| 9,187,324 B2 | | 11/2015 | Edlund | |

(56) References Cited

U.S. PATENT DOCUMENTS

| | | |
|---|---|---|
| 9,616,389 B2 | 4/2017 | Edlund |
| 9,656,215 B2 | 5/2017 | Edlund |
| 9,777,237 B2 | 10/2017 | Edlund |
| 9,914,641 B2 | 3/2018 | Edlund et al. |
| 10,166,506 B2 | 1/2019 | Edlund |
| 10,273,423 B2 | 4/2019 | Edlund |
| 10,391,458 B2 | 8/2019 | Edlund |
| 10,702,827 B2 | 7/2020 | Edlund |
| 2001/0045061 A1 | 11/2001 | Edlund et al. |
| 2002/0041837 A1 | 4/2002 | Edlund et al. |
| 2002/0062733 A1* | 5/2002 | Grantham .............. B01D 53/22 |
| | | 96/421 |
| 2002/0071976 A1 | 6/2002 | Edlund |
| 2002/0081235 A1 | 6/2002 | Baldwin et al. |
| 2002/0083829 A1 | 7/2002 | Edlund et al. |
| 2002/0100518 A1 | 8/2002 | Kuriiwa et al. |
| 2002/0114984 A1 | 8/2002 | Edlund et al. |
| 2003/0015096 A1 | 1/2003 | Sato et al. |
| 2003/0033933 A1 | 2/2003 | Frost et al. |
| 2003/0087138 A1 | 5/2003 | Margiott et al. |
| 2003/0091876 A1 | 5/2003 | Rusta-Sellehy et al. |
| 2003/0167690 A1 | 9/2003 | Edlund et al. |
| 2003/0172589 A1 | 9/2003 | Krueger |
| 2003/0192251 A1 | 10/2003 | Edlund et al. |
| 2003/0213365 A1 | 11/2003 | Jantsch et al. |
| 2003/0223926 A1 | 12/2003 | Edlund et al. |
| 2003/0223931 A1 | 12/2003 | Narayan |
| 2003/0228442 A1 | 12/2003 | Prince et al. |
| 2004/0003720 A1 | 1/2004 | Beisswenger et al. |
| 2004/0005720 A1 | 1/2004 | Cremer et al. |
| 2004/0065013 A1 | 4/2004 | DeVries |
| 2004/0066043 A1 | 4/2004 | Maiwald et al. |
| 2004/0067195 A1 | 4/2004 | Strizki et al. |
| 2004/0081867 A1 | 4/2004 | Edlund |
| 2004/0081868 A1 | 4/2004 | Edlund |
| 2004/0099138 A1 | 5/2004 | Karode et al. |
| 2004/0197616 A1 | 10/2004 | Edlund et al. |
| 2004/0200459 A1 | 10/2004 | Bennett et al. |
| 2004/0229090 A1 | 11/2004 | Davis et al. |
| 2005/0000802 A1 | 1/2005 | Hobbs |
| 2005/0074648 A1 | 4/2005 | Arthur |
| 2005/0129995 A1 | 6/2005 | Kato |
| 2005/0132640 A1 | 6/2005 | Kelly et al. |
| 2005/0154198 A1 | 7/2005 | Trotta et al. |
| 2005/0172554 A1 | 8/2005 | Basho et al. |
| 2005/0188616 A1 | 9/2005 | Bizjak et al. |
| 2005/0211480 A1 | 9/2005 | Kejha |
| 2005/0265915 A1 | 12/2005 | Tonkovich et al. |
| 2006/0019134 A1 | 1/2006 | Yagi et al. |
| 2006/0037244 A1 | 2/2006 | Clawson |
| 2006/0037476 A1 | 2/2006 | Edlund et al. |
| 2006/0051638 A1 | 3/2006 | Gross |
| 2006/0060084 A1* | 3/2006 | Edlund .................. B01D 53/22 |
| | | 95/55 |
| 2006/0081524 A1 | 4/2006 | Sengupta et al. |
| 2006/0083956 A1 | 4/2006 | Ukai et al. |
| 2006/0090397 A1 | 5/2006 | Edlund et al. |
| 2006/0112636 A1 | 6/2006 | Chellappa et al. |
| 2006/0127719 A1 | 6/2006 | Brantley et al. |
| 2006/0144700 A1 | 7/2006 | Carson et al. |
| 2006/0144788 A1 | 7/2006 | Cath et al. |
| 2006/0216562 A1 | 9/2006 | Edlund et al. |
| 2006/0225350 A1 | 10/2006 | Spallone |
| 2006/0233700 A1 | 10/2006 | Chellappa et al. |
| 2006/0272212 A1 | 12/2006 | Edlund |
| 2007/0062116 A1 | 3/2007 | Edlund et al. |
| 2007/0074904 A1 | 4/2007 | Kohora et al. |
| 2007/0172402 A1 | 7/2007 | Palo et al. |
| 2007/0183968 A1 | 8/2007 | Healey et al. |
| 2007/0190380 A1 | 8/2007 | DeVries |
| 2007/0266631 A1* | 11/2007 | Pledger .................... C01B 3/38 |
| | | 422/187 |
| 2007/0274904 A1 | 11/2007 | Popham et al. |
| 2007/0292729 A1 | 12/2007 | Brantley et al. |
| 2008/0029389 A1 | 2/2008 | Dreier et al. |

| | | |
|---|---|---|
| 2008/0031809 A1 | 2/2008 | Norbeck et al. |
| 2008/0041454 A1 | 2/2008 | Eijkelenberg et al. |
| 2008/0075987 A1 | 3/2008 | Kindler et al. |
| 2008/0085434 A1 | 4/2008 | Arthur |
| 2008/0115669 A1 | 5/2008 | Edlund et al. |
| 2008/0138677 A1 | 6/2008 | Edlund |
| 2008/0138678 A1* | 6/2008 | Hill ..................... H01M 8/0612 |
| | | 429/411 |
| 2008/0176118 A1 | 7/2008 | Edlund et al. |
| 2008/0187797 A1 | 8/2008 | Edlund |
| 2008/0210088 A1* | 9/2008 | Pledger ................ B01D 53/228 |
| | | 423/244.1 |
| 2008/0213638 A1 | 9/2008 | Brantley et al. |
| 2008/0222954 A1 | 9/2008 | Adams et al. |
| 2008/0230039 A1 | 9/2008 | Weiss et al. |
| 2009/0011310 A1 | 1/2009 | Trabold et al. |
| 2010/0028223 A1 | 2/2010 | Popham et al. |
| 2010/0050520 A1 | 3/2010 | Arnold et al. |
| 2010/0055518 A1 | 3/2010 | Chen et al. |
| 2010/0064887 A1 | 3/2010 | Edlund et al. |
| 2010/0068132 A1 | 3/2010 | Vencill et al. |
| 2010/0167155 A1 | 7/2010 | Kim et al. |
| 2010/0181765 A1 | 7/2010 | More et al. |
| 2010/0230079 A1 | 9/2010 | Byers et al. |
| 2010/0261074 A1 | 10/2010 | Edlund et al. |
| 2010/0263538 A1 | 10/2010 | DeVries |
| 2011/0014528 A1 | 1/2011 | Kani et al. |
| 2011/0111314 A1 | 5/2011 | Cui et al. |
| 2011/0137537 A1 | 6/2011 | Leone |
| 2011/0180396 A1 | 7/2011 | Giacomini |
| 2011/0212375 A1 | 9/2011 | Taguchi et al. |
| 2011/0250518 A1 | 10/2011 | Edlund et al. |
| 2011/0256459 A1 | 10/2011 | Edlund |
| 2011/0256491 A1 | 10/2011 | Edlund et al. |
| 2012/0058403 A1 | 3/2012 | Edlund et al. |
| 2012/0097610 A1 | 4/2012 | Zheng et al. |
| 2012/0208903 A1 | 8/2012 | Gafney |
| 2013/0011301 A1 | 1/2013 | Edlund |
| 2013/0090505 A1 | 4/2013 | Catchpole |
| 2014/0065020 A1 | 3/2014 | Edlund et al. |
| 2014/0065021 A1 | 3/2014 | Edlund |
| 2014/0326447 A1 | 11/2014 | Fermaniuk |
| 2015/0033711 A1* | 2/2015 | Hyde ..................... C10L 5/363 |
| | | 60/281 |
| 2015/0122128 A1 | 5/2015 | Edlund |
| 2016/0083251 A1 | 3/2016 | Edlund et al. |
| 2016/0130515 A1 | 5/2016 | Edlund |
| 2016/0131424 A1 | 5/2016 | Edlund |
| 2016/0325990 A1 | 11/2016 | Galloway |
| 2016/0340185 A1 | 11/2016 | Xiang |
| 2017/0043300 A1 | 2/2017 | Stoltenberg et al. |
| 2017/0209828 A1 | 7/2017 | Edlund |
| 2017/0216805 A1 | 8/2017 | Edlund |
| 2018/0126330 A1 | 5/2018 | Edlund et al. |
| 2018/0264398 A1 | 9/2018 | Edlund et al. |
| 2019/0118132 A1 | 4/2019 | Edlund |
| 2019/0135626 A1 | 5/2019 | Rafati et al. |
| 2019/0336920 A1 | 11/2019 | Edlund |
| 2020/0289977 A1 | 9/2020 | Edlund |
| 2020/0289978 A1 | 9/2020 | Edlund |
| 2020/0316517 A1 | 10/2020 | Edlund |
| 2021/0162335 A1 | 6/2021 | Edlund |
| 2021/0402349 A1 | 12/2021 | Edlund et al. |
| 2023/0192487 A1* | 6/2023 | Hill ........................ B01D 65/02 |
| | | 423/648.1 |
| 2024/0316487 A1* | 9/2024 | Vestad ............... B01D 53/0446 |
| 2024/0399297 A1* | 12/2024 | Studebaker ........ B01D 63/0822 |

FOREIGN PATENT DOCUMENTS

| | | |
|---|---|---|
| CN | 1524308 A | 8/2004 |
| CN | 1931708 A | 3/2007 |
| CN | 101214921 A | 7/2008 |
| CN | 201161926 A | 12/2008 |
| CN | 101350411 A | 1/2009 |
| CN | 101542805 A | 9/2009 |
| CN | 101837955 A | 9/2010 |
| CN | 101956634 A | 1/2011 |

(56)          References Cited

FOREIGN PATENT DOCUMENTS

| | | | |
|---|---|---|---|
| CN | 105163832 | A | 12/2015 |
| CN | 105271118 | A | 1/2016 |
| CN | 107265403 | A | 3/2020 |
| CN | 111542383 | A | 8/2020 |
| CN | 107697885 | B | 5/2021 |
| DE | 69120740 | T2 | 11/1996 |
| DE | 69219084 | T2 | 7/1997 |
| DE | 69730071 | T2 | 8/2005 |
| DE | 60035418 | T2 | 3/2008 |
| DE | 202007008841 | U1 | 6/2008 |
| EP | 0036268 | A1 | 9/1981 |
| EP | 0570185 | A2 | 11/1993 |
| EP | 0652042 | A1 | 5/1995 |
| EP | 0470822 | B1 | 7/1996 |
| EP | 0546808 | B1 | 4/1997 |
| EP | 0718031 | A1 | 4/1997 |
| EP | 0783919 | A1 | 7/1997 |
| EP | 0957063 | A1 | 11/1999 |
| EP | 1010942 | A3 | 2/2003 |
| EP | 0800852 | B1 | 8/2004 |
| EP | 1272259 | B1 | 10/2004 |
| EP | 1516663 | A2 | 3/2005 |
| EP | 1135822 | B1 | 4/2005 |
| EP | 1279431 | B1 | 4/2005 |
| EP | 1523054 | A2 | 4/2005 |
| EP | 1557395 | A2 | 7/2005 |
| EP | 1679111 | A2 | 7/2006 |
| EP | 0951529 | B1 | 8/2006 |
| EP | 1252678 | B1 | 11/2006 |
| EP | 1189678 | B1 | 7/2007 |
| EP | 1290747 | B1 | 2/2009 |
| EP | 1138096 | B1 | 10/2010 |
| EP | 2359928 | A2 | 8/2011 |
| EP | 2631213 | A1 | 8/2013 |
| EP | 2969132 | A1 | 1/2016 |
| GB | 2355418 | A | 4/2001 |
| GB | 2370241 | A | 6/2002 |
| GB | 2432369 | A | 4/2010 |
| JP | 63021204 | A | 1/1988 |
| JP | 63039622 | A | 2/1988 |
| JP | 63126539 | A | 5/1988 |
| JP | 63252903 | A | 10/1988 |
| JP | 64063019 | A | 3/1989 |
| JP | H6127903 | A | 5/1994 |
| JP | H06290800 | A | 10/1994 |
| JP | H1052621 | A | 2/1998 |
| JP | 11265833 | A | 9/1999 |
| JP | 2001010804 | A | 1/2001 |
| JP | 3360766 | B2 | 12/2002 |
| JP | 2002346372 | A | 12/2002 |
| JP | 2003081603 | A | 3/2003 |
| JP | 2003511336 | A | 3/2003 |
| JP | 2003277019 | A | 10/2003 |
| JP | 2003282119 | A | 10/2003 |
| JP | 2003290637 | B2 | 10/2003 |
| JP | 2003530664 | A | 10/2003 |
| JP | 2003334418 | A | 11/2003 |
| JP | 2004071242 | A | 3/2004 |
| JP | 2004525488 | A | 8/2004 |
| JP | 2005067990 | A | 3/2005 |
| JP | 2005154198 | A | 6/2005 |
| JP | 2005296746 | A | 7/2005 |
| JP | 2005520306 | A | 7/2005 |
| JP | 2006012817 | A | 1/2006 |
| JP | 2006019033 | A | 1/2006 |
| JP | 2006040597 | A | 2/2006 |
| JP | 2006503780 | A | 2/2006 |
| JP | 2006137668 | A | 6/2006 |
| JP | 2006523795 | A | 10/2006 |
| JP | 2007095548 | A | 4/2007 |
| JP | 2007099528 | A | 4/2007 |
| JP | 2008518871 | A | 6/2008 |
| JP | 2008171815 | A | 7/2008 |
| JP | 2008528430 | A | 7/2008 |
| JP | 2008536796 | A | 9/2008 |
| JP | 2008253984 | A | 10/2008 |
| JP | 2008285404 | A | 11/2008 |
| JP | 2008308351 | A | 12/2008 |
| JP | 2009000659 | A | 1/2009 |
| JP | 2009509299 | A | 3/2009 |
| JP | 2009173534 | A | 8/2009 |
| JP | 2010010050 | A | 1/2010 |
| JP | 2010013323 | A | 1/2010 |
| JP | 2010111543 | A | 5/2010 |
| JP | 2011057480 | A | 3/2011 |
| JP | 2002293504 | A | 10/2012 |
| JP | 2014520750 | A | 8/2014 |
| JP | 2014517804 | A | 6/2016 |
| JP | 2016516655 | A | 6/2016 |
| JP | 6538764 | B2 | 6/2019 |
| JP | 6975286 | B2 | 12/2021 |
| MX | 381667 | A | 4/2021 |
| TW | 563270 | B1 | 11/2003 |
| TW | 200404739 | A | 4/2004 |
| TW | 200629635 | A | 8/2006 |
| TW | 200740014 | A | 10/2007 |
| TW | 200804177 | A | 1/2008 |
| TW | 201429868 | A | 8/2014 |
| TW | 201733903 | A | 10/2017 |
| TW | 201815663 | A | 5/2018 |
| TW | I700246 | A | 8/2020 |
| TW | 202045437 | A | 12/2020 |
| WO | 8806489 | A1 | 9/1988 |
| WO | 9919456 | A1 | 4/1999 |
| WO | 0022690 | A1 | 4/2000 |
| WO | 0056425 | A1 | 9/2000 |
| WO | 0108247 | A1 | 2/2001 |
| WO | 0112311 | A1 | 2/2001 |
| WO | 0112539 | A1 | 2/2001 |
| WO | 0126174 | A1 | 4/2001 |
| WO | 0150541 | A1 | 7/2001 |
| WO | 0150542 | A1 | 7/2001 |
| WO | 0168514 | A2 | 9/2001 |
| WO | 0170376 | A1 | 9/2001 |
| WO | 0173879 | A1 | 10/2001 |
| WO | 0193362 | A1 | 12/2001 |
| WO | 0238265 | A1 | 5/2002 |
| WO | 0249128 | A2 | 6/2002 |
| WO | 02069428 | A1 | 9/2002 |
| WO | 03002244 | A1 | 1/2003 |
| WO | 03026776 | A1 | 4/2003 |
| WO | 03041188 | A2 | 5/2003 |
| WO | 03077331 | A2 | 9/2003 |
| WO | 03086964 | A1 | 10/2003 |
| WO | 03089128 | A1 | 10/2003 |
| WO | 03100900 | A1 | 12/2003 |
| WO | 2004038845 | A1 | 5/2004 |
| WO | 2004091005 | A2 | 10/2004 |
| WO | 2005001955 | A2 | 1/2005 |
| WO | 2005091785 | A2 | 10/2005 |
| WO | 2005119824 | A2 | 12/2005 |
| WO | 2006011619 | A1 | 2/2006 |
| WO | 2006033773 | A2 | 3/2006 |
| WO | 2006049918 | A2 | 5/2006 |
| WO | 2006050335 | A2 | 5/2006 |
| WO | 2006081402 | A2 | 8/2006 |
| WO | 2006133003 | A2 | 12/2006 |
| WO | 2007035467 | A2 | 3/2007 |
| WO | 2007037856 | A2 | 4/2007 |
| WO | 2007049130 | A1 | 5/2007 |
| WO | 2008008279 | A2 | 1/2008 |
| WO | 2008033301 | A1 | 3/2008 |
| WO | 2008105770 | A1 | 9/2008 |
| WO | 2009088962 | A1 | 7/2009 |
| WO | 2010033628 | A1 | 3/2010 |
| WO | 2010118221 | A1 | 10/2010 |
| WO | 2011059446 | A1 | 5/2011 |
| WO | 2012067612 | A1 | 5/2012 |
| WO | 2012091121 | A1 | 7/2012 |
| WO | 2013158343 | A1 | 10/2013 |
| WO | 2014099606 | A1 | 6/2014 |
| WO | 2014158749 | A1 | 10/2014 |

(56)                References Cited

FOREIGN PATENT DOCUMENTS

WO          2015183426 A1      12/2015
WO          2019136156 A1      7/2019
WO          2022047106 A1      3/2022

OTHER PUBLICATIONS

HGS-M Series Hydrogen Generator: Powering Fuel Cells from readily available Methanol, www.hy9.com, Hopkinton, Massachusetts, USA, updated Jun. 20, 2011, 2 pages.
U.S. Receiving Office, International Search Report and Written Opinion for International Application No. PCT/US12/45437, dated Nov. 19, 2012, 12 pages.
U.S. Receiving Office, International Preliminary Report for PCT Application No. PCT/US2012/045437, dated Jan. 7, 2014, 7 pages.
Taiwan Intellectual Property Office, Examination Report in Taiwanese Patent Application No. 101124209, dated Dec. 19, 2013, 32 pages.
U.S. Receiving Office, International Search Report and Written Opinion for PCT Application No. PCT/US13/56908, dated Jan. 24, 2014, 2 pages.
U.S. Receiving Office, International Search and Written Opinion report for PCT Application No. PCT/US2014/019837, dated Jun. 6, 2014, 8 pages.
Taiwan Intellectual Property Office, Examination Report for Taiwanese Patent Application No. 102131014, dated Dec. 27, 2014, 29 pages.
State Intellectual Property Office of the P.R.C., Office Action for Chinese Patent Application No. 201280039436.0, dated Jan. 27, 2015, 28 pages.
United States Patent and Trademark Office, Office Action for U.S. Appl. No. 13/600,096, dated Feb. 5, 2015, 9 pages.
Japan Patent Office, Office Action for Japanese Patent Application No. 2014-519267, dated Apr. 6, 2015, 13 pages.
Taiwan Intellectual Property Office, Office Action for Taiwanese Patent Application No. 103134184, dated Apr. 30, 2015, 17 pages.
U.S. Patent and Trademark Office, Office Action for U.S. Appl. No. 13/600,096, dated Jun. 1, 2015, 9 pages.
U.S. Patent and Trademark Office, Office Action for U.S. Appl. No. 13/829,766, dated Jun. 26, 2015, 6 pages.
U.S. Patent and Trademark Office, Office Action for U.S. Appl. No. 13/600,096, dated Sep. 11, 2015, 9 pages.
Taiwan Intellectual Property Office, Decision of Rejection for Taiwanese Patent Application No. 102131014, dated Nov. 2, 2015, 15 pages.
Taiwan Intellectual Property Office, Examination Report for Taiwanese Patent Application No. 103108640, dated Nov. 23, 2015, 39 pages.
State Intellectual Property Office of the P.R.C., Office Action for Chinese Patent Application No. 201380052485.2, dated Jan. 12, 2016, 29 pages.
Japan Patent Office, Office Action for Japanese Patent Application No. 2015-529963, dated Jan. 18, 2016, 7 pages.
European Patent Office, Extended Search Report for European Patent Application No. 13832056.9, dated Mar. 18, 2016, 6 pages.
State Intellectual Property Office of the P.R.C., Office Action for Chinese Patent Application No. 2016062901774250, dated Jul. 4, 2016, 18 pages.
State Intellectual Property Office of the P.R.C., Office Action for Chinese Patent Application No. 201380052485.2, dated Jul. 20, 2016, 31 pages.
Decision of Rejection prepared by the Taiwan Intellectual Property Office for Taiwanese Patent Application No. 103108640, dated Aug. 25, 2016, 25 pages.
Japan Patent Office, Office Action for Japanese Patent Application No. 2015-135010, dated Sep. 12, 2016, 15 pages.
U.S. Patent and Trademark Office, Office Action for U.S. Appl. No. 14/594,997, dated Sep. 15, 2016, 85 pages.

Japan Patent Office, Office Action for Japanese Patent Application No. 2016-500545, dated Oct. 3, 2016, 6 pages.
European Patent Office, Supplementary Search Report for European Patent Application No. 14773171.5, dated Oct. 14, 2016, 7 pages.
State Intellectual Property Office of the P.R.C., Office Action for Chinese Patent Application No. 201380052485.2, dated Dec. 29, 2016, 15 pages.
European Patent Office, Extended Search Report for European Patent Application No. 14773171.5, dated Feb. 13, 2017, 13 pages.
European Patent Office, Communication for European Patent Application No. 14773171.5, dated Mar. 2, 2017, 1 page.
Office Action prepared by the Chinese Patent Office for Chinese Patent Application No. 201480015413.5, dated Mar. 9, 2017, 17 pages.
Office Action prepared by the Chinese Patent Office for Chinese Patent Application No. 201510896209.5, dated Mar. 14, 2017, 6 pages.
Office Action prepared by the US Patent and Trademark Office for U.S. Appl. No. 14/961,529, dated Jul. 26, 2017, 79 pages.
Office Action prepared by the Taiwan intellectual Property Office for Taiwanese Patent Application No. 103108640, dated Jul. 27, 2017, 2 pages.
Office Action prepared by the European Patent Office for European Patent Application No. 13832056.9, dated Dec. 19, 2017, 4 pages.
Office Action prepared by the Chinese Patent Office for Chinese Patent Application No. 2015108962095, dated Jan. 4, 2018, 8 pages.
Office Action prepared by the Japanese Patent Office for Japanese Patent Application No. 2017-130918, dated Feb. 26, 2018, 9 pages.
Examination Report prepared by the Indian Patent Office for Indian Patent Application No. 433/KOLNP/2015, dated Feb. 28, 2018, 7 pages.
Office Action prepared by the US Patent and Trademark Office for U.S. Appl. No. 15/483,265, dated May 22, 2018, 56 pages.
Office Action prepared by the European Patent Office for EP 14 773 171.5-1104, dated Jul. 20, 2018, 5 pages.
Office Action prepared by the Japanese Patent Office for JP 2017-130918, dated Jul. 30, 2018, 7 pages.
Office Action prepared by the European Patent Office for EP 13 832 056.9-1101, dated Aug. 21, 2018, 4 pages.
Notice of Reasons for Rejection prepared by the Japanese Patent Office for JP 2017-182239, dated Nov. 12, 2018, 4 pages.
Decision to Reject the Amendments prepared by the Japanese Patent Office for JP 2017-130918, dated Dec. 3, 2018, 6 pages.
Office Action prepared by the State Intellectual Property Office of PR China for CN 201710352484.X, dated Dec. 11, 2018, 14 pages.
International Search Report and Written Opinion prepared by the US Patent and Trademark Office for PCT/US2019/012192, dated Mar. 8, 2019, 11 pages.
Office Action prepared by the US Patent and Trademark Office for U.S. Appl. No. 15/486,755, dated Mar. 18, 2019, 77 pages.
Office Action prepared by the European Patent Office for EP 13 832 056.9, dated Mar. 20, 2019, 5 pages.
Office Action prepared by the US Patent and Trademark Office for U.S. Appl. No. 16/287,482, dated Jun. 12, 2019, 10 pages.
International Search Report and Written Opinion, prepared by the International Searching Authority, PCT Application No. PCTUS2024/29474, Sep. 12, 2024, 29 pgs.
Office Action prepared by the Chinese Patent Office for CN 201710352484X, dated Jul. 18, 2019, 3 pages.
Hearing Notice for In 433/KOLNP/2015, dated Jul. 30, 2019, 2 pages.
Office Action prepared by the China National Intellectual Property Administration for CN 201710102421, dated Sep. 16, 2019, 27 pages.
Election/Restriction Requirement prepared by the US Patent and Trademark Office for U.S. Appl. No. 15/862,474, dated Sep. 30, 2019, 6 pages.
Office Action prepared by the US Patent and Trademark Office for U.S. Appl. No. 15/985,175, dated Oct. 10, 2019, 57 pages.
Office Action prepared by the Taiwan Patent Office for TW 107145920, dated Nov. 5, 2019, 21 pages.
Office Action prepared by the US Patent and Trademark Office for U.S. Appl. No. 15/985,175, dated Jan. 29, 2020, 8 pages.

(56)          References Cited

OTHER PUBLICATIONS

Office Action prepared by the Chinese Patent Office for CN201710102421, dated Apr. 16, 2020, 29 pages.
Examiner's Report prepared by the Canadian Patent Office for CA 2,967,340, dated May 22, 2020, 4 pages.
Office Action prepared by the Mexican Patent Office for MX/a/2015/012252, dated Jul. 23, 2020, 7 pages.
Office Action prepared by the European Patent Office for EP13832056, dated Sep. 3, 2020, 4 pages.
Office Action prepared by the US Patent and Trademark Office for U.S. Appl. No. 16/904,872, dated Sep. 22, 2020, 8 pages.
Office Action prepared by the Chinese Patent Office for CN201710102421, dated Oct. 20, 2020, 32 pages.
First Examination Report prepared by the Indian Patent Office for IN 202037032378, dated Oct. 21, 2020, 7 pages.
Office Action prepared by the US Patent and Trademark Office for U.S. Appl. No. 16/891,477, dated Nov. 6, 2020 6 pages.
Final Office Action prepared by the US Patent and Trademark Office for U.S. Appl. No. 16/904,872, dated Jan. 27, 2021, 11 pages.
First Office Action prepared by the Japanese Patent Office for JP 2020-79526, dated Mar. 15, 2021, 6 pages.
Office Action prepared by the US Patent and Trademark Office for U.S. Appl. No. 16/513,324, dated Jul. 26, 2021, 70 pages.
Office Action prepared by the Japanese Patent Office for JP 2020-537176, dated Aug. 30, 2021, 11 pages.
Extended European Search Report prepared by the European Patent Office for EP19735938.3, dated Sep. 21, 2021, 7 pages.
Office Action prepared by the Chinese Patent Office for CN 201980007152.5, dated Sep. 26, 2021, 26 pages.
Final Office Action prepared by the US Patent and Trademark Office for U.S. Appl. No. 16/513,324, dated Nov. 15, 2021, 12 pages.
International Search Report and Written Opinion prepared by the US Patent and Trademark Office for PCT/US2021/047866, dated Dec. 16, 2021, 11 pages.

Notice of Preliminary Rejection prepared by the Korean Intellectual Property Office, Korean Patent Application No. 10-2020-7022167, dated Jan. 19, 2022, 16 pages.
Decision of Rejection, prepared by the China National Intellectual Property Administration (CNIPA), Chinese Patent Application No. 201980007152.5, dated Mar. 25, 2022, 22 pages.
Examination Report prepared by the Taiwan Intellectual Property Office (TIPO), Taiwan Patent Application No. 110131460, dated May 12, 2022, 38 pages.
Office Action prepared by the US Patent and Trademark Office for U.S. Appl. No. 17/167,555, dated Jun. 10, 2022, 68 pages.
Rejection Report prepared by the Taiwan Intellectual Property Office (TIPO), Taiwan Patent Application No. 110131460, dated Sep. 13, 2022, 9 pages.
Final Office Action prepared by the US Patent and Trademark Office for U.S. Appl. No. 17/167,555, dated Oct. 31, 2022, 10 pages.
International Search Report and Written Opinion prepared by the US Patent and Trademark Office for PCT/US2022/32503, dated Oct. 25, 2022, 17 pages.
Notice of Preliminary Rejection prepared by the Korean Intellectual Property Office, Korean Patent Application No. 10-2022-7033348, dated Nov. 7, 2022, 11 pages.
Office Action prepared by the US Patent and Trademark Office for U.S. Appl. No. 17/348,400 dated Dec. 13, 2022, 8 pages.
Office Action prepared by the Japanese Patent Office for JP2022-3522, dated Dec. 23, 2022, 11 pages.
Office Action prepared by the Taiwan Intellectual Property Office (TIPO), Taiwan Patent Application No. 111120271, Jul. 11, 2023, 43 pages.
Office Action prepared by the Taiwan Intellectual Property Office (TIPO), Taiwan Patent Application No. 113118950, Mar. 12, 2025, 14 pages.
Office Action prepared by the European Patent Office for EP 14773171.5, dated Jun. 28, 2019, 4 pages.

* cited by examiner

HYDROGEN PURIFICATION DEVICES

BACKGROUND OF THE DISCLOSURE

A hydrogen generation assembly is an assembly that converts one or more feedstocks into a product stream containing hydrogen gas as a majority component. The feedstocks may include a carbon-containing feedstock and, in some embodiments, also may include water. The feedstocks are delivered to a hydrogen-producing region of the hydrogen generation assembly from a feedstock delivery system, typically with the feedstocks being delivered under pressure and at elevated temperatures. The hydrogen-producing region is often associated with a temperature modulating assembly, such as a heating assembly or cooling assembly, which consumes one or more fuel streams to maintain the hydrogen-producing region within a suitable temperature range for effectively producing hydrogen gas. The hydrogen generation assembly may generate hydrogen gas via any suitable mechanism(s), such as steam reforming, autothermal reforming, pyrolysis, and/or catalytic partial oxidation.

The generated or produced hydrogen gas may, however, have impurities. That gas may be referred to as a mixed gas stream that contains hydrogen gas and other gases. Prior to using the mixed gas stream, it must be purified, such as to remove at least a portion of the other gases. The hydrogen generation assembly may therefore include a hydrogen purification device for increasing the hydrogen purity of the mixed gas stream. The hydrogen purification device may include at least one hydrogen-selective membrane to separate the mixed gas stream into a product stream and a byproduct stream. The product stream contains a greater concentration of hydrogen gas and/or a reduced concentration of one or more of the other gases from the mixed gas stream. Hydrogen purification using one or more hydrogen-selective membranes is a pressure driven separation process in which one or more hydrogen-selective membranes are contained in a pressure vessel. The mixed gas stream contacts the mixed gas surface of the membrane(s), and the product stream is formed from at least a portion of the mixed gas stream that permeates through the membrane(s). The pressure vessel is typically sealed to prevent gases from entering or leaving the pressure vessel except through defined inlet and outlet ports or conduits.

The product stream may be used in a variety of applications. One such application is energy production, such as in electrochemical fuel cells. An electrochemical fuel cell is a device that converts fuel and an oxidant to electricity, a reaction product, and heat. For example, fuel cells may convert hydrogen and oxygen into water and electricity. In those fuel cells, the hydrogen is the fuel, the oxygen is the oxidant, and the water is a reaction product. Fuel cell stacks include a plurality of fuel cells and may be utilized with a hydrogen generation assembly to provide an energy production assembly.

Examples of hydrogen generation assemblies, hydrogen processing assemblies, and/or components of those assemblies are described in U.S. Pat. Nos. 5,861,137; 6,319,306; 6,494,937; 6,562,111; 7,063,047; 7,306,868; 7,470,293; 7,601,302; 7,632,322; 8,961,627; and U.S. Patent Application Publication Nos. 2006/0090397; 2006/0272212; 2007/0266631; 2007/0274904; 2008/0085434; 2008/0138678; 2008/0230039; and 2010/0064887. The complete disclosures of the above patents and patent application publications are hereby incorporated by reference for all purposes.

DETAILED DESCRIPTION OF THE DISCLOSURE

Figure 1:
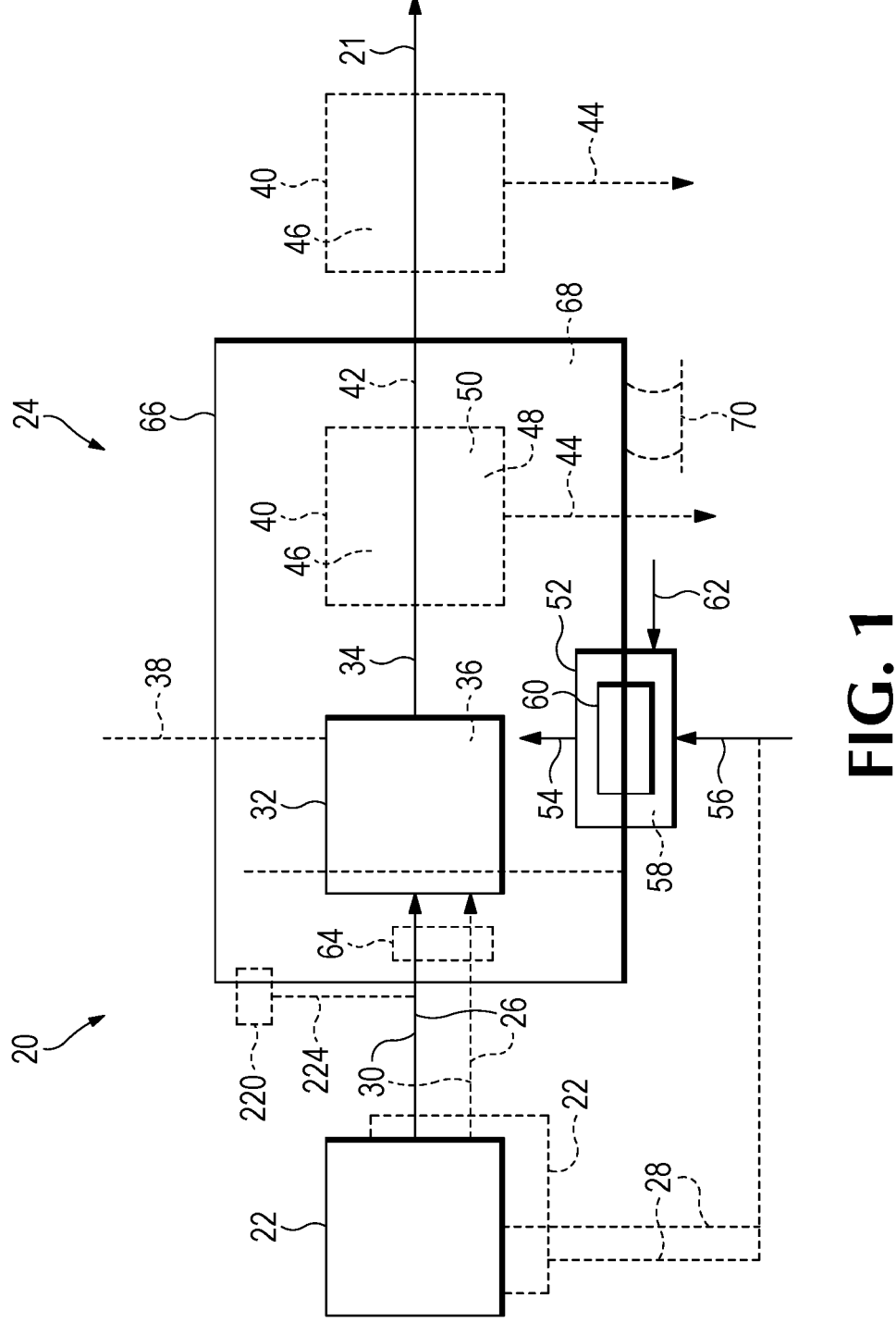
FIG. 1 is a schematic view of an example of a hydrogen generation assembly.

FIG. 1 shows an example of a hydrogen generation assembly 20. Unless specifically excluded hydrogen generation assembly 20 may include one or more components of other hydrogen generation assemblies described in this disclosure. The hydrogen generation assembly may include any suitable structure configured to generate a product hydrogen stream 21. For example, the hydrogen generation assembly may include a feedstock delivery system 22 and a fuel processing assembly 24. The feedstock delivery system may include any suitable structure configured to selectively deliver at least one feed stream 26 to the fuel processing assembly.

In some embodiments, feedstock delivery system 22 may additionally include any suitable structure configured to selectively deliver at least one fuel stream 28 to a burner or other heating assembly of fuel processing assembly 24. In some embodiments, feed stream 26 and fuel stream 28 may be the same stream delivered to different parts of the fuel processing assembly. The feedstock delivery system may include any suitable delivery mechanisms, such as a positive displacement or other suitable pump or mechanism for propelling fluid streams. In some embodiments, feedstock delivery system may be configured to deliver feed stream(s) 26 and/or fuel stream(s) 28 without requiring the use of pumps and/or other electrically powered fluid-delivery mechanisms. Examples of suitable feedstock delivery systems that may be used with hydrogen generation assembly 20 include the feedstock delivery systems described in U.S. Pat. Nos. 7,470,293 and 7,601,302, and U.S. Patent Application Publication No. 2006/0090397. The complete disclosures of the above patents and patent application are hereby incorporated by reference for all purposes.

Feed stream 26 may include at least one hydrogen-production fluid 30, which may include one or more fluids that may be utilized as reactants to produce product hydrogen stream 21. For example, the hydrogen-production fluid may include a carbon-containing feedstock, such as at least one hydrocarbon and/or alcohol. Examples of suitable hydrocarbons include methane, propane, natural gas, diesel, kerosene, gasoline, etc. Examples of suitable alcohols include methanol, ethanol, polyols (such as ethylene glycol and propylene glycol), etc. Additionally, hydrogen-production fluid 30 may include water, such as when the fuel processing assembly generates the product hydrogen stream via steam reforming and/or autothermal reforming. When fuel processing assembly 24 generates the product hydrogen stream via pyrolysis or catalytic partial oxidation, feed stream 26 does not contain water.

In some embodiments, feedstock delivery system 22 may be configured to deliver a hydrogen-production fluid 30 that contains a mixture of water and a carbon-containing feedstock that is miscible with water (such as methanol and/or another water-soluble alcohol). The ratio of water to carbon-containing feedstock in such a fluid stream may vary according to one or more factors, such as the particular carbon-containing feedstock being used, user preferences, design of the fuel processing assembly, mechanism(s) used by the fuel processing assembly to generate the product hydrogen stream etc. For example, the molar ratio of water to carbon may be approximately 1:1 to 3:1. Additionally, mixtures of water and methanol may be delivered at or near a 1:1 molar ratio (37 weight % water, 63 weight % methanol), while mixtures of hydrocarbons or other alcohols may be delivered at a water-to-carbon molar ratio greater than 1:1.

When fuel processing assembly 24 generates product hydrogen stream 21 via reforming, feed stream 26 may include, for example, approximately 25-75 volume % methanol or ethanol (or another suitable water-miscible carbon-containing feedstock) and approximately 25-75 volume % water. For feed streams that at least substantially include methanol and water, those streams may include approximately 50-75 volume % methanol and approximately 25-50 volume % water. Streams containing ethanol or other water-miscible alcohols may contain approximately 25-60 volume % alcohol and approximately 40-75 volume % water. An example of a feed stream for hydrogen generating assembly 20 that utilizes steam reforming or autothermal reforming contains 69 volume % methanol and 31 volume % water.

Although feedstock delivery system 22 is shown to be configured to deliver a single feed stream 26, the feedstock delivery system may be configured to deliver two or more feed streams 26. Those streams may contain the same or different feedstocks and may have different compositions, at least one common component, no common components, or the same compositions. For example, a first feed stream may include a first component, such as a carbon-containing feedstock and a second feed stream may include a second component, such as water. Additionally, although feedstock delivery system 22 may, in some embodiments, be configured to deliver a single fuel stream 28, the feedstock delivery system may be configured to deliver two or more fuel streams. The fuel streams may have different compositions, at least one common component, no common components, or the same compositions. Moreover, the feed and fuel streams may be discharged from the feedstock delivery system in different phases. For example, one of the streams may be a liquid stream while the other is a gas stream. In some embodiments, both streams may be liquid streams, while in other embodiments both streams may be gas streams. Furthermore, although hydrogen generation assembly 20 is shown to include a single feedstock delivery system 22, the hydrogen generation assembly may include two or more feedstock delivery systems 22.

Fuel processing assembly 24 may include a hydrogen-producing region 32 configured to produce an output stream 34 containing hydrogen gas via any suitable hydrogen-producing mechanism(s). The output stream may include hydrogen gas as at least a majority component and may include additional gaseous component(s). Output stream 34 may therefore be referred to as a "mixed gas stream" that contains hydrogen gas as its majority component but which includes other gases.

Hydrogen-producing region 32 may include any suitable catalyst-containing bed or region. When the hydrogen-producing mechanism is steam reforming, the hydrogen-producing region may include a suitable steam reforming catalyst 36 to facilitate production of output stream(s) 34 from feed stream(s) 26 containing a carbon-containing feedstock and water. In such an embodiment, fuel processing assembly 24 may be referred to as a "steam reformer," hydrogen-producing region 32 may be referred to as a "reforming region," and output stream 34 may be referred to as a "reformate stream." The other gases that may be present in the reformate stream may include carbon monoxide, carbon dioxide, methane, steam, and/or unreacted carbon-containing feedstock.

When the hydrogen-producing mechanism is autothermal reforming, hydrogen-producing region 32 may include a suitable autothermal reforming catalyst to facilitate the production of output stream(s) 34 from feed stream(s) 26 containing water and a carbon-containing feedstock in the presence of air. Additionally, fuel processing assembly 24 may include an air delivery assembly 38 configured to deliver air stream(s) to the hydrogen-producing region.

In some embodiments, fuel processing assembly 24 may include a purification (or separation) region 40, which may include any suitable structure configured to produce at least one hydrogen-rich stream 42 from output (or mixed gas) stream 34. Hydrogen-rich stream 42 may include a greater hydrogen concentration than output stream 34 and/or a reduced concentration of one or more other gases (or impurities) that were present in that output stream. Product hydrogen stream 21 includes at least a portion of hydrogen-rich stream 42. Thus, product hydrogen stream 21 and hydrogen-rich stream 42 may be the same stream and have the same composition and flow rates. Alternatively, some of the purified hydrogen gas in hydrogen-rich stream 42 may be stored for later use, such as in a suitable hydrogen storage assembly and/or consumed by the fuel processing assembly. Purification region 40 also may be referred to as a "hydrogen purification device" or a "hydrogen processing assembly."

In some embodiments, purification region 40 may produce at least one byproduct stream 44, which may contain no hydrogen gas or some hydrogen gas. The byproduct stream may be exhausted, sent to a burner assembly and/or other combustion source, used as a heated fluid stream, stored for later use, and/or otherwise utilized, stored, and/or disposed. Additionally, purification region 40 may emit the byproduct stream as a continuous stream responsive to the delivery of output stream 34, or may emit that stream intermittently, such as in a batch process or when the byproduct portion of the output stream is retained at least temporarily in the purification region.

Fuel processing assembly 24 may include one or more purification regions configured to produce one or more byproduct streams containing sufficient amounts of hydrogen gas to be suitable for use as a fuel stream (or a feedstock stream) for a heating assembly for the fuel processing assembly. In some embodiments, the byproduct stream may have sufficient fuel value or hydrogen content to enable a heating assembly to maintain the hydrogen-producing region at a desired operating temperature or within a selected range of temperatures. For example, the byproduct stream may include hydrogen gas, such as 10-30 volume % hydrogen gas, 15-25 volume % hydrogen gas, 20-30 volume % hydrogen gas, at least 10 or 15 volume % hydrogen gas, at least 20 volume % hydrogen gas, etc.

Purification region 40 may include any suitable structure configured to enrich (and/or increase) the concentration of at least one component of output stream 21. In most applications, hydrogen-rich stream 42 will have a greater hydrogen concentration than output stream (or mixed gas stream) 34. The hydrogen-rich stream also may have a reduced concentration of one or more non-hydrogen components that were present in output stream 34 with the hydrogen concentration of the hydrogen-rich stream being more, the same, or less than the output stream. For example, in conventional fuel cell systems, carbon monoxide may damage a fuel cell stack if it is present in even a few parts per million, while other non-hydrogen components that may be present in output stream 34, such as water, will not damage the stack even if present in much greater concentrations. Therefore, in such an application, the purification region may not increase the overall hydrogen concentration but will reduce the concentration of one or more non-hydrogen components that are harmful, or potentially harmful, to the desired application for the product hydrogen stream.

Examples of suitable devices for purification region 40 include one or more hydrogen-selective membranes 46, chemical carbon monoxide removal assemblies 48, and/or pressure swing adsorption (PSA) systems 50. Purification region 40 may include more than one type of purification device and the devices may have the same or different structures and/or operate by the same or different mechanism(s). Fuel processing assembly 24 may include at least one restrictive orifice and/or other flow restrictor downstream of the purification region(s), such as associated with one or more product hydrogen stream(s), hydrogen-rich stream(s), and/or byproduct stream(s).

Hydrogen-selective membranes 46 are permeable to hydrogen gas, but at least substantially (if not completely) impermeable to other components of output stream 34. Membranes 46 may be formed of any hydrogen-permeable material suitable for use in the operating environment and parameters in which purification region 40 is operated. Examples of suitable materials for membranes 46 include palladium and palladium alloys, and especially thin films of such metals and metal alloys. Palladium alloys have proven particularly effective, especially palladium with 35 weight % to 45 weight % copper. A palladium-copper alloy that contains approximately 40 weight % copper has proven particularly effective, although other relative concentrations and components may be used. Three other especially effective alloys are palladium with 2 weight % to 20 weight % gold, especially palladium with 5 weight % gold; palladium with 3 weight % to 10 weight % indium plus 0 weight % to 10 weight % ruthenium, especially palladium with 6 weight % indium plus 0.5 weight % ruthenium; and palladium with 20 weight % to 30 weight % silver. When palladium and palladium alloys are used, hydrogen-selective membranes 46 may sometimes be referred to as "foils." Typical thickness of hydrogen-permeable metal foils is less than 25 microns (micrometers), preferably less than or equal to 15 microns, and most preferably between 5 and 12 microns. The foils may be any suitable dimensions, such as 110 mm by 270 mm.

Chemical carbon monoxide removal assemblies 48 are devices that chemically react carbon monoxide and/or other undesirable components of output stream 34 to form other compositions that are not as potentially harmful. Examples of chemical carbon monoxide removal assemblies include water-gas shift reactors that are configured to produce hydrogen gas and carbon dioxide from water and carbon monoxide, partial oxidation reactors that are configured to convert carbon monoxide and oxygen (usually from air) into carbon dioxide, and methanation reactors that are configured to convert carbon monoxide and hydrogen to methane and water. Fuel processing assembly 24 may include more than one type and/or number of chemical removal assemblies 48.

Pressure swing adsorption (PSA) is a chemical process in which gaseous impurities are removed from output stream 34 based on the principle that certain gases, under the proper conditions of temperature and pressure, will be adsorbed onto an adsorbent material more strongly than other gases. Typically, the non-hydrogen impurities are adsorbed and removed from output stream 34. Adsorption of impurity gases occurs at elevated pressure. When the pressure is reduced, the impurities are desorbed from the adsorbent material, thus regenerating the adsorbent material. Typically, PSA is a cyclic process and requires at least two beds for continuous (as opposed to batch) operation. Examples of suitable adsorbent materials that may be used in adsorbent beds are activated carbon and zeolites. PSA system 50 also provides an example of a device for use in purification region 40 in which the byproducts, or removed components, are not directly exhausted from the region as a gas stream concurrently with the purification of the output stream. Instead, these byproduct components are removed when the adsorbent material is regenerated or otherwise removed from the purification region.

In FIG. 1, purification region 40 is shown within fuel processing assembly 24. The purification region may alternatively be separately located downstream from the fuel processing assembly, as is schematically illustrated in dash-dot lines in FIG. 1. Purification region 40 also may include portions within and external to the fuel processing assembly.

Fuel processing assembly 24 also may include a temperature modulating assembly in the form of a heating assembly 52. The heating assembly may be configured to produce at least one heated exhaust stream (or combustion stream) 54 from at least one heating fuel stream 28, typically as combusted in the presence of air. Heated exhaust stream 54 is schematically illustrated in FIG. 1 as heating hydrogen-producing region 32. Heating assembly 52 may include any suitable structure configured to generate the heated exhaust stream, such as a burner or combustion catalyst in which a fuel is combusted with air to produce the heated exhaust stream. The heating assembly may include an ignitor or ignition source 58 that is configured to initiate the combustion of fuel. Examples of suitable ignition sources include one or more spark plugs, glow plugs, combustion catalyst, pilot lights, piezoelectric ignitors, spark igniters, hot surface igniters, etc.

In some embodiments, heating assembly 52 may include a burner assembly 60 and may be referred to as a combustion-based, or combustion-driven, heating assembly. In a combustion-based heating assembly, heating assembly 52 may be configured to receive at least one fuel stream 28 and to combust the fuel stream in the presence of air to provide a hot combustion stream 54 that may be used to heat at least the hydrogen-producing region of the fuel processing assembly. Air may be delivered to the heating assembly via a variety of mechanisms. For example, an air stream 62 may be delivered to the heating assembly as a separate stream, as shown in FIG. 1. Alternatively, or additionally, air stream 62 may be delivered to the heating assembly with at least one of the fuel streams 28 for heating assembly 52 and/or drawn from the environment within which the heating assembly is utilized.

Combustion stream 54 may additionally, or alternatively, be used to heat other portions of the fuel processing assembly and/or fuel cell systems with which the heating assembly is used. Additionally, other configuration and types of heating assemblies 52 may be used. For example, heating assembly 52 may be an electrically powered heating assembly that is configured to heat at least hydrogen-producing region 32 of fuel processing assembly 24 by generating heat using at least one heating element, such as a resistive heating element. In those embodiments, heating assembly 52 may not receive and combust a combustible fuel stream to heat the hydrogen-producing region to a suitable hydrogen-producing temperature. Examples of heating assemblies are disclosed in U.S. Pat. No. 7,632,322, the complete disclosure of which is hereby incorporated by reference for all purposes.

Heating assembly 52 may be housed in a common shell or housing with the hydrogen-producing region and/or separation region (as further discussed below). The heating assembly may be separately positioned relative to hydrogen-producing region 32 but in thermal and/or fluid communication with that region to provide the desired heating of at least the hydrogen-producing region. Heating assembly 52 may be located partially or completely within the common shell, and/or at least a portion (or all) of the heating assembly may be located external that shell. When the heating assembly is located external the shell, the hot combustion gases from burner assembly 60 may be delivered via suitable heat transfer conduits to one or more components within the shell.

The heating assembly also may be configured to heat feedstock delivery system 22, the feedstock supply streams, hydrogen-producing region 32, purification (or separation) region 40, or any suitable combination of those systems, streams, and regions. Heating of the feedstock supply streams may include vaporizing liquid reactant streams or components of the hydrogen-production fluid used to produce hydrogen gas in the hydrogen-producing region. In that embodiment, fuel processing assembly 24 may be described as including a vaporization region 64. The heating assembly may additionally be configured to heat other components of the hydrogen generation assembly. For example, the heated exhaust stream may be configured to heat a pressure vessel and/or other canister containing the heating fuel and/or the hydrogen-production fluid that forms at least portions of feed stream 26 and fuel stream 28.

Heating assembly 52 may achieve and/or maintain in hydrogen-producing region 32 any suitable temperatures. Steam reformers typically operate at temperatures in the range of 200° C. and 900° C. However, temperatures outside this range are within the scope of this disclosure. When the carbon-containing feedstock is methanol, the steam reforming reaction will typically operate in a temperature range of approximately 200-500° C. Example subsets of that range include 350-450° C., 375-425° C., and 375-400° C. When the carbon-containing feedstock is a hydrocarbon, ethanol or another alcohol, a temperature range of approximately 400-900° C. will typically be used for the steam reforming reaction. Example subsets of that range include 750-850° C., 725-825° C., 650-750° C., 700-800° C., 700-900° C., 500-800° C., 400-600° C., and 600-800° C. Hydrogen-producing region 32 may include two or more zones, or portions, each of which may be operated at the same or at different temperatures. For example, when the hydrogen-production fluid includes a hydrocarbon, hydrogen-producing region 32 may include two different hydrogen-producing portions, or regions, with one operating at a lower temperature than the other to provide a pre-reforming region. In those embodiments, the fuel processing assembly may also be referred to as including two or more hydrogen-producing regions.

Fuel stream 28 may include any combustible liquid(s) and/or gas(es) that are suitable for being consumed by heating assembly 52 to provide the desired heat output. Some fuel streams may be gases when delivered and combusted by heating assembly 52, while others may be delivered to the heating assembly as a liquid stream. Examples of suitable heating fuels for fuel streams 28 include carbon-containing feedstocks, such as methanol, methane, ethane, ethanol, ethylene, propane, propylene, butane, etc. Additional examples include low molecular weight condensable fuels, such as liquefied petroleum gas, ammonia, lightweight amines, dimethyl ether, and low molecular weight hydrocarbons. Yet other examples include hydrogen and carbon monoxide. In embodiments of hydrogen generation assembly 20 that include a temperature modulating assembly in the form of a cooling assembly instead of a heating assembly (such as may be used when an exothermic hydrogen-generating process—e.g., partial oxidation—is utilized instead of an endothermic process such as steam reforming), the feedstock delivery system may be configured to supply a fuel or coolant stream to the assembly. Any suitable fuel or coolant fluid may be used.

Fuel processing assembly 24 may additionally include a shell or housing 66 in which at least hydrogen-producing region 32 is contained, as shown in FIG. 1. In some embodiments, vaporization region 64 and/or purification region 40 may additionally be contained within the shell. Shell 66 may enable components of the steam reformer or other fuel processing mechanism to be moved as a unit. The shell also may protect components of the fuel processing assembly from damage by providing a protective enclosure and/or may reduce the heating demand of the fuel processing assembly because components may be heated as a unit. Shell 66 may include insulating material 68, such as a solid insulating material, blanket insulating material, and/or an air-filled cavity. The insulating material may be internal the shell, external the shell, or both. When the insulating material is external a shell, fuel processing assembly 24 may further include an outer cover or jacket 70 external the insulation, as schematically illustrated in FIG. 1. The fuel processing assembly may include a different shell that includes additional components of the fuel processing assembly, such as feedstock delivery system 22 and/or other components.

One or more components of fuel processing assembly 24 may either extend beyond the shell or be located external the shell. For example, purification region 40 may be located external shell 66, such as being spaced-away from the shell but in fluid communication by suitable fluid-transfer conduits. As another example, a portion of hydrogen-producing region 32 (such as portions of one or more reforming catalyst beds) may extend beyond the shell, such as indicated schematically with a dashed line representing an alternative shell configuration in FIG. 1. Examples of suitable hydrogen generation assemblies and its components are disclosed in U.S. Pat. Nos. 5,861,137; 5,997,594; and 6,221, 117, the complete disclosures of which are hereby incorporated by reference for all purposes.

Figure 2:
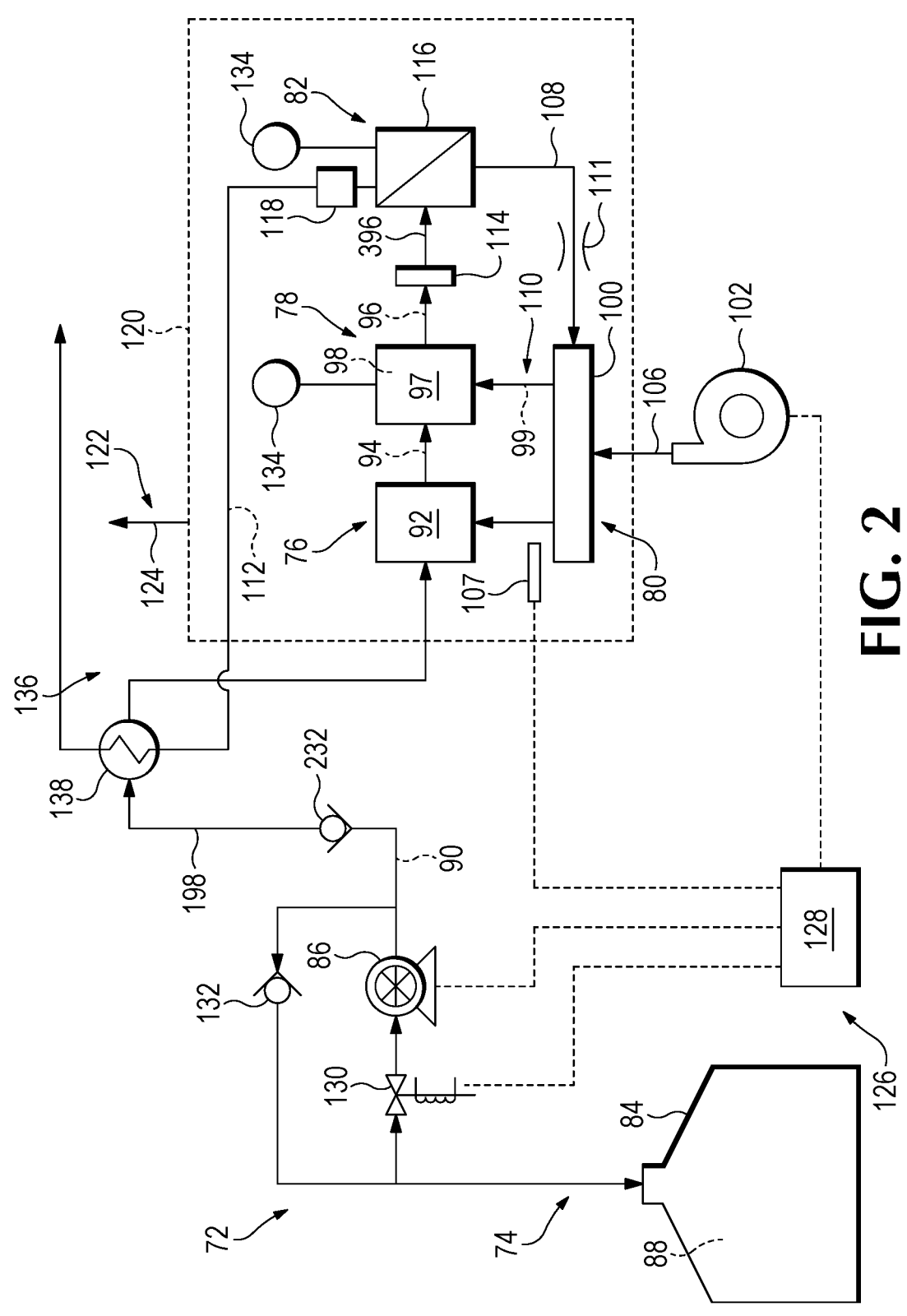
FIG. 2 is a schematic view of an example of the hydrogen generation assembly of FIG. 1.

Another example of hydrogen generation assembly 20 is shown in FIG. 2, and is generally indicated at 72. Unless specifically excluded, hydrogen generation assembly 72 may include one or more components of hydrogen generation assembly 20. Hydrogen-generation assembly 72 may include a feedstock delivery system 74, a vaporization region 76, a hydrogen-producing region 78, and a heating assembly 80, as shown in FIG. 2. In some embodiments, hydrogen generation assembly 20 also may include a purification region 82.

The feedstock delivery system may include any suitable structure configured to deliver one or more feed and/or fuel streams to one or more other components of the hydrogen-generation assembly. For example, feedstock delivery system may include a feedstock tank (or container) 84 and a pump 86. The feedstock tank may contain any suitable hydrogen-production fluid 88, such as water and a carbon-containing feedstock (e.g., a methanol/water mixture). Pump 86 may have any suitable structure configured to deliver the hydrogen-production fluid, which may be in the form of at least one liquid-containing feed stream 90 that includes water and a carbon-containing feedstock, to vaporization region 76 and/or hydrogen-producing region 78.

Vaporization region 76 may include any suitable structure configured to receive and vaporize at least a portion of a liquid-containing feed stream, such as liquid-containing feed stream 90. For example, vaporization region 76 may include a vaporizer 92 configured to at least partially transform liquid-containing feed stream 90 into one or more vapor feed streams 94. The vapor feed streams may, in some embodiments, include liquid. An example of a suitable vaporizer is a coiled tube vaporizer, such as a coiled stainless steel tube.

Hydrogen-producing region 78 may include any suitable structure configured to receive one or more feed streams, such as vapor feed stream(s) 94 from the vaporization region, to produce one or more output streams 96 containing hydrogen gas as a majority component and other gases. The hydrogen-producing region may produce the output stream via any suitable mechanism(s). For example, hydrogen-producing region 78 may generate output stream(s) 96 via a steam reforming reaction. In that example, hydrogen-producing region 78 may include a steam reforming region 97 with a reforming catalyst 98 configured to facilitate and/or promote the steam reforming reaction. When hydrogen-producing region 78 generates output stream(s) 96 via a steam reforming reaction, hydrogen generation assembly 72 may be referred to as a "steam reforming hydrogen generation assembly" and output stream 96 may be referred to as a "reformate stream."

Heating assembly 80 may include any suitable structure configured to produce at least one heated exhaust stream 99 for heating one or more other components of the hydrogen generation assembly 72. For example, the heating assembly may heat the vaporization region to any suitable temperature(s), such as at least a minimum vaporization temperature or the temperature in which at least a portion of the liquid-containing feed stream is vaporized to form the vapor feed stream. Additionally, or alternatively, heating assembly 80 may heat the hydrogen-producing region to any suitable temperature(s), such as at least a minimum hydrogen-producing temperature or the temperature in which at least a portion of the vapor feed stream is reacted to produce hydrogen gas to form the output stream. The heating assembly may be in thermal communication with one or more components of the hydrogen generation assembly, such as the vaporization region and/or hydrogen-producing region.

The heating assembly may include a burner assembly 100, at least one air blower 102, and an igniter assembly 104, as shown in FIG. 2. The burner assembly may include any suitable structure configured to receive at least one air stream 106 and at least one fuel stream 108 and to combust the at least one fuel stream within a combustion region 110 to produce heated exhaust stream 99. The fuel stream may be provided by feedstock delivery system 74 and/or purification region 82. The combustion region may be contained within an enclosure of the hydrogen generation assembly. Air blower 102 may include any suitable structure configured to generate air stream(s) 106. Igniter assembly 104 may include any suitable structure configured to ignite fuel stream(s) 108.

Purification region 82 may include any suitable structure configured to produce at least one hydrogen-rich stream 112, which may include a greater hydrogen concentration than output stream 96 and/or a reduced concentration of one or more other gases (or impurities) that were present in that output stream. The purification region may produce at least one byproduct stream or fuel stream 108, which may be sent to burner assembly 100 and used as a fuel stream for that assembly, as shown in FIG. 2. Purification region 82 may include a flow restricting orifice 111, a filter assembly 114, a membrane assembly 116, and a methanation reactor assembly 118. The filter assembly (such as one or more hot gas filters) may be configured to remove impurities from output stream 96 prior to the hydrogen purification membrane assembly.

Membrane assembly 116 may include any suitable structure configured to receive output or mixed gas stream(s) 96 that contains hydrogen gas and other gases, and to generate permeate or hydrogen-rich stream(s) 112 containing a greater concentration of hydrogen gas and/or a lower concentration of other gases than the mixed gas stream. Membrane assembly 116 may incorporate hydrogen-permeable (or hydrogen-selective) membranes that are planar or tubular, and more than one hydrogen-permeable membrane may be incorporated into membrane assembly 116. The permeate stream(s) may be used for any suitable applications, such as for one or more fuel cells. In some embodiments, the membrane assembly may generate a byproduct or fuel stream 108 that includes at least a substantial portion of the other gases. Methanation reactor assembly 118 may include any suitable structure configured to convert carbon monoxide and hydrogen to methane and water. Although purification region 82 is shown to include flow restricting orifice 111, filter assembly 114, membrane assembly 116, and methanation reactor assembly 118, the purification region may have less than all of those assemblies, and/or may alternatively, or additionally, include one or more other components configured to purify output stream 96. For example, purification region 82 may include only membrane assembly 116.

In some embodiments, hydrogen generation assembly 72 may include a shell or housing 120 which may at least partially contain one or more other components of that assembly. For example, shell 120 may at least partially contain vaporization region 76, hydrogen-producing region 78, heating assembly 80, and/or purification region 82, as shown in FIG. 2. Shell 120 may include one or more exhaust ports 122 configured to discharge at least one combustion exhaust stream 124 produced by heating assembly 80.

Hydrogen generation assembly 72 may, in some embodiments, include a control system 126, which may include any suitable structure configured to control operation of hydrogen generation assembly 72. For example, control assembly 126 may include a control assembly 128, at least one valve 130, at least one pressure relief valve 132, and one or more temperature measurement devices 134. Control assembly 128 may detect temperatures in the hydrogen-producing region and/or purification regions via the temperature measurement device 134, which may include one or more thermocouples and/or other suitable devices. Based on the detected temperatures, the control assembly and/or an operator of the control system may adjust delivery of feed stream 90 to vaporization region 76 and/or hydrogen-producing region 78 via valve(s) 130 and pump(s) 86. Valve(s) 130 may include a solenoid valve and/or any suitable valve(s). Pressure relief valve(s) 132 may be configured to ensure that excess pressure in the system is relieved.

In some embodiments, hydrogen generation assembly 72 may include a heat exchange assembly 136, which may include one or more heat exchangers 138 configured to transfer heat from one portion of the hydrogen generation assembly to another portion. For example, heat exchange assembly 136 may transfer heat from hydrogen-rich stream 112 to feed stream 90 to raise the temperature of the feed stream prior to entering vaporization region 76, as well as to cool hydrogen-rich stream 112.

Figure 3:
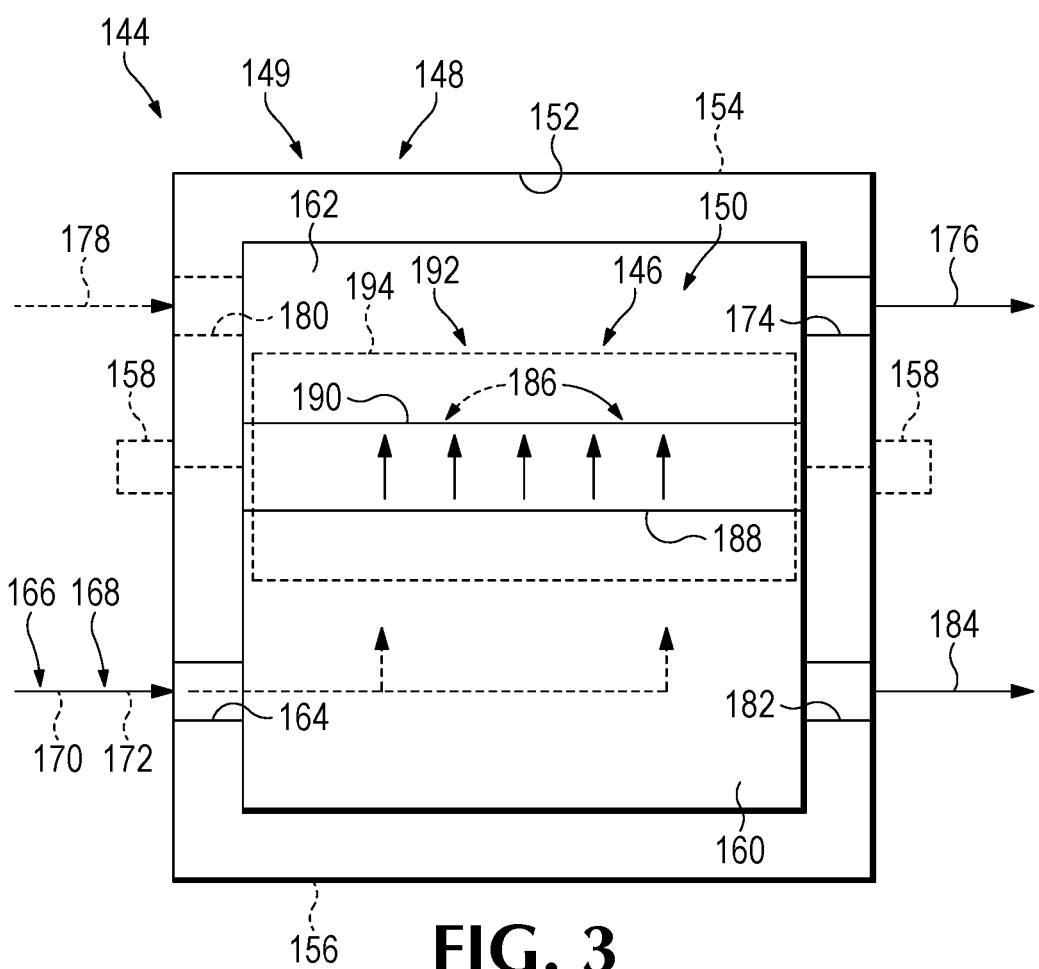
FIG. 3 is a schematic view of a hydrogen purification device of the hydrogen generation assembly of FIG. 1 or FIG. 2.

An example of a purification region 40 (or hydrogen purification device) of hydrogen generation assembly 20 of FIG. 1 is generally indicated at 144 in FIG. 3. Unless specifically excluded, the hydrogen purification device may include one or more components of the other purification regions described in this disclosure. Hydrogen purification device 40 may include a hydrogen-separation region 146 and an enclosure 148. The enclosure may define an internal volume 150 having an internal perimeter 152. Enclosure 148 may include at least a first portion 154 and a second portion 156 coupled together to form a body 149 in the form of a sealed pressure vessel that may include defined input and output ports. Those ports may define fluid paths by which gases and other fluids are delivered into and removed from the enclosure's internal volume.

First and second portions 154 and 156 may be coupled together using any suitable retention mechanism or structure 158. Examples of suitable retention structures include welds and/or bolts. Examples of seals that may be used to provide a fluid-tight interface between the first and second portions may include gaskets and/or welds. Additionally, or alternatively, first and second portions 154 and 156 may be secured together so that at least a predetermined amount of compression is applied to various components that define the hydrogen-separation region within the enclosure and/or other components that may be incorporated into a hydrogen generation assembly. The applied compression may ensure that various components are maintained in appropriate positions within the enclosure. Additionally, or alternatively, the compression applied to the various components that define the hydrogen-separation region and/or other components may provide fluid-tight interfaces between the various components that define the hydrogen-separation region, various other components, and/or between the components that define the hydrogen-separation region and other components.

Enclosure 148 may include a mixed gas region 160 and a permeate region 162, as shown in FIG. 3. The mixed gas and permeate region may be separated by hydrogen-separation region 146. At least one input port 164 may be provided, through which a fluid stream 166 is delivered to the enclosure. Fluid stream 166 may be a mixed gas stream 168 that contains hydrogen gas 170 and other gases 172 that are delivered to mixed gas region 160. Hydrogen gas may be a majority component of the mixed gas stream. Hydrogen-separation region 146 may extend between mixed gas region 160 and permeate region 162 so that gas in the mixed gas region must pass through the hydrogen-separation region in order to enter the permeate region. The gas may, for example, be required to pass through at least one hydrogen-selective membrane as discussed further below. The permeate and mixed gas regions may be of any suitable relative size within the enclosure.

Enclosure 148 also may include at least one product output port 174 through which a permeate stream 176 may be received and removed from permeate region 162. The permeate stream may contain at least one of a greater concentration of hydrogen gas and a lower concentration of other gases than the mixed gas stream. Permeate stream 176 may, in some embodiments, include at least initially a carrier, or sweep, gas component, such as may be delivered as a sweep gas stream 178 through a sweep gas port 180 that is in fluid communication with the permeate region. The enclosure also may include at least one byproduct output port 182 through which a byproduct stream 184 containing at least one of a substantial portion of other gases 172 and a reduced concentration of hydrogen gas 170 (relative to the mixed gas stream) is removed from the mixed gas region.

Hydrogen-separation region 146 may include at least one hydrogen-selective membrane 186 having a first or mixed gas surface 188, which is oriented for contact by mixed gas stream 168, and a second or permeate surface 190, which is generally opposed to surface 188. Mixed gas stream 168 may be delivered to the mixed gas region of the enclosure so that it comes into contact with the mixed gas surface of the one or more hydrogen-selective membranes. Permeate stream 176 may be formed from at least a portion of the mixed gas stream that passes through the hydrogen-separation region to permeate region 162. Byproduct stream 184 may be formed from at least a portion of the mixed gas stream that does not pass through the hydrogen-separation region. In some embodiments, byproduct stream 184 may contain a portion of the hydrogen gas present in the mixed gas stream. The hydrogen-separation region also may be configured to trap or otherwise retain at least a portion of the other gases, which may then be removed as a byproduct stream as the separation region is replaced, regenerated, or otherwise recharged.

In FIG. 3, streams 166, 176, 178, and/or 184 may include more than one actual stream flowing into or out of hydrogen purification device 144. For example, the hydrogen purification device may receive a plurality of mixed gas streams 168, a single mixed gas stream 168 that is divided into two or more streams prior to contacting hydrogen-separation region 146, a single stream that is delivered into internal volume 150, etc. Thus, enclosure 148 may include more than one input port 164, product output port 174, sweep gas port 180, and/or byproduct output port 182.

The hydrogen-selective membranes may be formed of any hydrogen-permeable material suitable for use in the operating environment and parameters in which the hydrogen purification device is operated. Examples of hydrogen purification devices are disclosed in U.S. Pat. Nos. 5,997,594 and 6,537,352, the complete disclosures of which are hereby incorporated by reference for all purposes. In some embodiments, the hydrogen-selective membranes may be formed from at least one of palladium and a palladium alloy. Examples of palladium alloys include alloys of palladium with copper, silver, and/or gold. Examples of various membranes, membrane configuration, and methods for preparing membranes and membrane configurations are disclosed in U.S. U.S. Pat. Nos. 6,152,995; 6,221,117; 6,319,306; and 6,537,352, the complete disclosures of which are hereby incorporated by reference for all purposes.

In some embodiments, a plurality of spaced-apart hydrogen-selective membranes 186 may be used in a hydrogen-separation region to form at least a portion of a hydrogen-separation assembly 192. When present, the plurality of membranes may collectively define one or more membrane assemblies 194. In such embodiments, the hydrogen-separation assembly may generally extend from first portion 154 to second portion 156. Thus, the first and second portions may effectively compress the hydrogen-separation assembly. In some embodiments, enclosure 148 may additionally, or alternatively, include end plates (or end frames) coupled to opposite sides of a body portion. In such embodiments, the end plates may effectively compress the hydrogen-separation assembly (and other components that may be housed within the enclosure) between the pair of opposing end plates.

Hydrogen purification using one or more hydrogen-selective membranes is typically a pressure-driven separation process in which the mixed gas stream is delivered into contact with the mixed gas surface of the membranes at a higher pressure than the gases in the permeate region of the hydrogen-separation region. The hydrogen-separation region may, in some embodiments, be heated via any suitable mechanism to an elevated temperature when the hydrogen-separation region is utilized to separate the mixed gas stream into the permeate and byproduct streams. Examples of suitable operating temperatures for hydrogen purification using palladium and palladium alloy membranes include temperatures of at least 275° C., temperatures of at least 325° C., temperatures of at least 350° C., temperatures in the range of 275-500° C., temperatures in the range of 275-375° C., temperatures in the range of 300-450° C., temperatures in the range of 350-450° C., etc.

Figure 4:
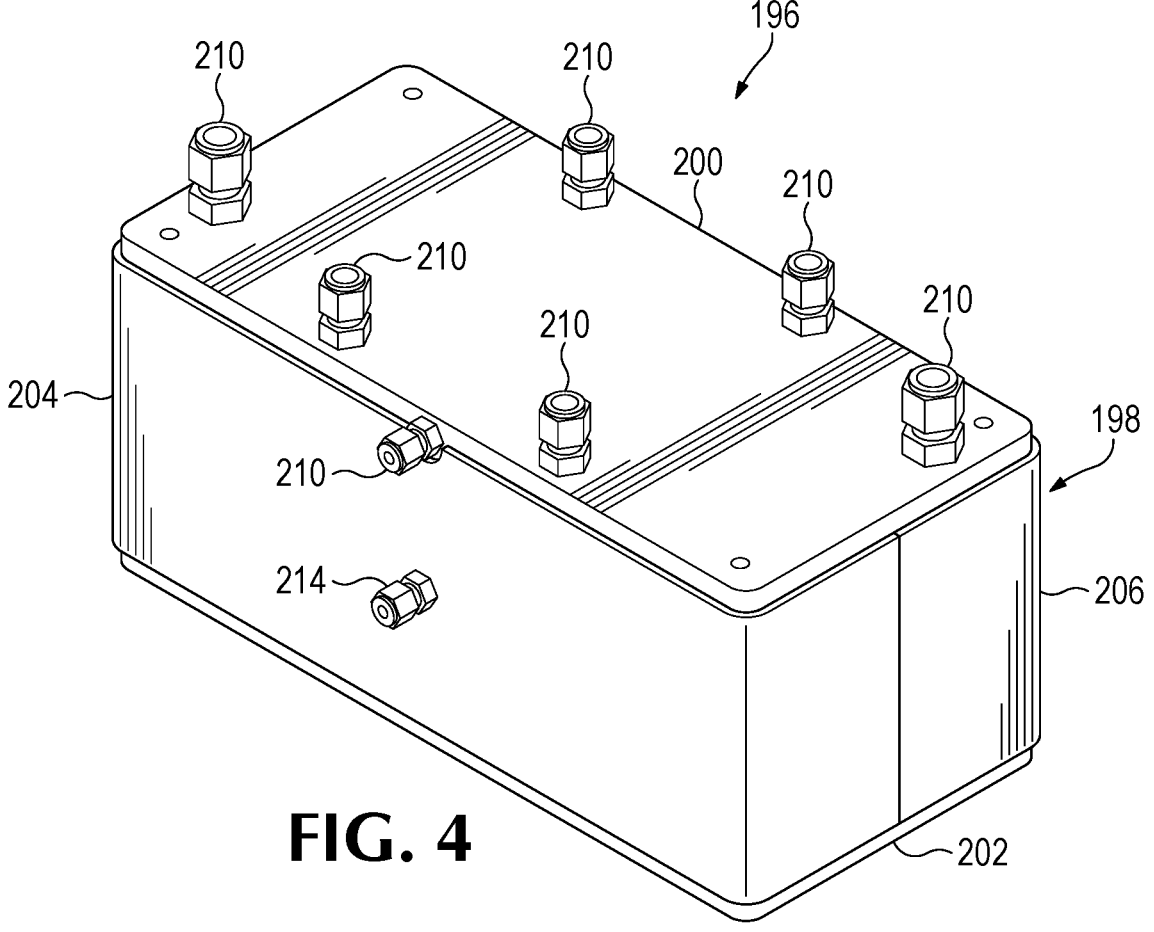
FIG. 4 is an isometric view of an example of the hydrogen purification device of FIG. 3.
Figure 5:
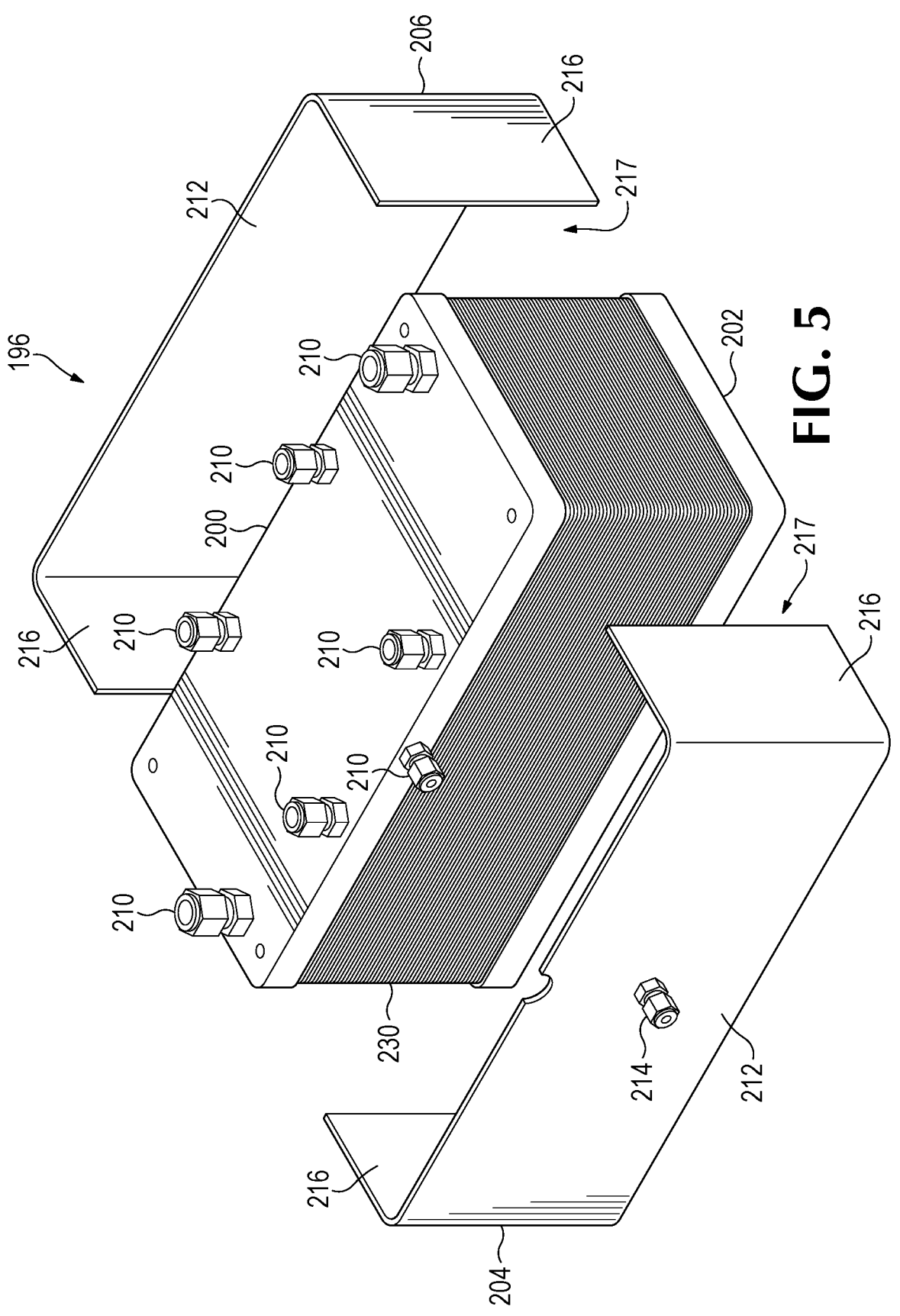
FIG. 5 is an isometric view of the hydrogen purification device of FIG. 4, shown with illustrative side plates detached.

An example of a hydrogen purification device 144 is generally indicated at 196 in FIGS. 4-5. Unless specifically excluded, hydrogen purification device 196 may include one or more components of other hydrogen purification devices and/or purification regions described in this disclosure. Hydrogen purification device 196 may include a shell or enclosure 198, which may include a first end plate or end frame 200, a second end plate or end frame 202, a first side plate 204, and a second side plate 206 that collectively enclose a plurality of frames as further discussed below. The first and second end plates may be configured to be secured and/or compressed together to define a sealed pressure vessel having an interior compartment 207 (shown in FIG. 6) in which the hydrogen-separation region is supported. The first and/or second end plates may include various input, output, sweep gas, control, and byproduct ports 210 similar to hydrogen purification device 144.

First and second side plates 204, 206 may be attached to first and second end frames 200, 202 and/or to each other. In some examples, the first and second side plates may be seal welded to each other and/or to the first and second and frames. Each of the side plates may include an elongate base member 212 having a leak or mixed gas port 213 and side members 215 attached to, or formed with, opposed longitudinal ends of the elongate base member. The leak port may be configured to receive gases that leak from one or more various areas, regions, and/or conduits of the hydrogen purification device, such as between adjacent frames and/or the interface(s) between adjacent frames as further discussed below. In other words, gases that leak from the frames of the hydrogen purification device may accumulate in an interior space 217 between the first and second side plates and the frames and can be removed from that interior space via leak port 214. In the example shown in FIGS. 4-5, the side members are perpendicularly attached, or formed with, the elongate base member. However, other examples of hydrogen purification device 196 may include side plates 204, 206 having side members that are attached to, or formed with, the elongate base member in orientations other than perpendicular, such as to conform to the shape of the frames.

Figure 6:
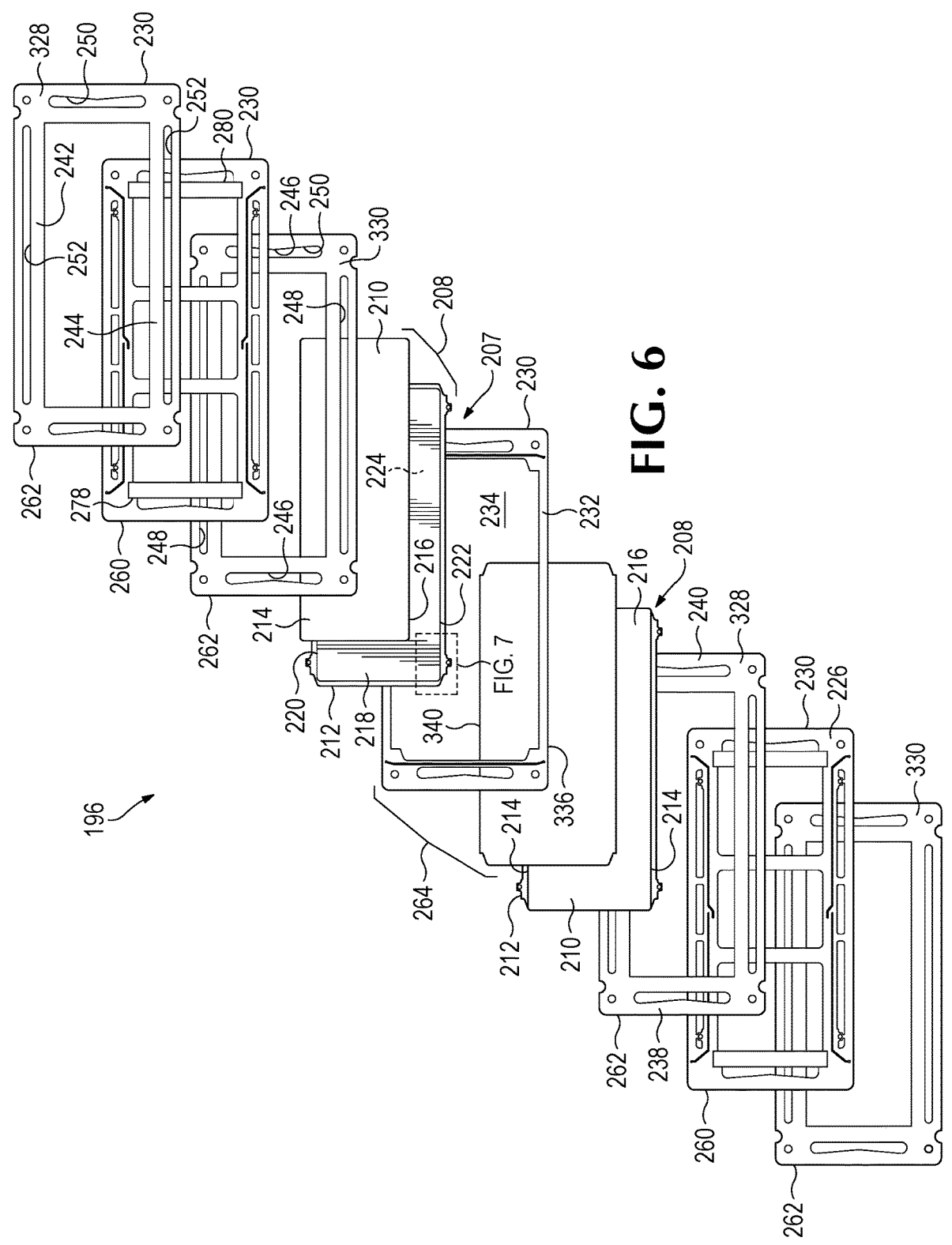
FIG. 6 is an exploded isometric view of the hydrogen purification device of FIG. 4, shown without end frames and shown with one of two foil-microscreen assemblies exploded.

As shown in FIG. 6, hydrogen purification device 196 also may include at least one foil-microscreen assembly 208, which may be disposed between and/or secured to the first and second end plates. The foil-microscreen assembly may include at least one hydrogen-selective membrane 210 and at least one microscreen structure 212. The hydrogen-selective membrane may be configured to receive at least part of the mixed gas stream from the input port and to separate the mixed gas stream into at least part of the permeate stream and at least part of the byproduct stream. Hydrogen-selective membrane 210 may include a feed side 214 and a permeate side 216. At least part of the permeate stream is formed from the portion of the mixed gas stream that passes from the feed side to the permeate side, with the remaining portion of the mixed gas stream, which remains on the feed side, forms at least part of the byproduct stream.

One or more of the hydrogen-selective membranes may be metallurgically bonded to microscreen structure 212. For example, the permeate side of the hydrogen-selective membrane(s) may be metallurgically bonded to the microscreen structure. In some embodiments, one or more of hydrogen-selective membranes 210 (and/or the permeate side of those membrane(s)) may be diffusion bonded to the microscreen structure to form a solid-state diffusion bond between the membrane(s) and the microscreen structure. For example, the permeate side of the membrane(s) and the microscreen structure may be brought in contact with each other and exposed to elevated temperature and/or elevated pressure to allow the surfaces of the membrane(s) and the microscreen structure to intersperse themselves over time.

Figure 7:
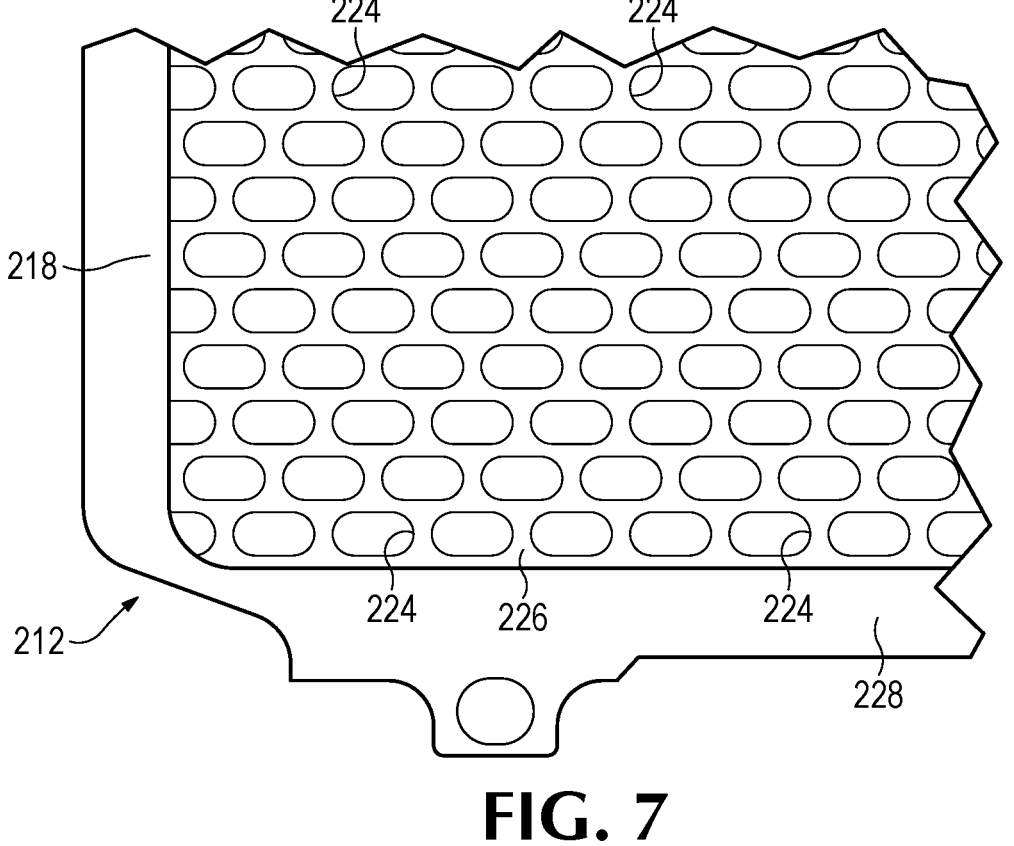
FIG. 7 is a partial view of an example of a microscreen support structure of the hydrogen purification device of FIG. 4.

Microscreen structure 212 may include any suitable structure configured to support the hydrogen-selective membrane (s). For example, the microscreen structure may include a non-porous planar sheet 218 having generally opposed surfaces 220 and 222 configured to provide support to permeate side 216, and a plurality of apertures 224 that forms a plurality of fluid passages extending between the opposed surfaces which allows the permeate stream to flow through the microscreen structure, as shown in FIG. 7. The apertures may be formed on the non-porous planar sheet via electrochemical etching, chemical etching, laser drilling, and other mechanical forming processes, such as stamping or die cutting. In other words, the planar sheet may be made of one or more materials that are not porous and/or do not include any openings or apertures and the only apertures or openings on that sheet are added via one or more of the above methods. In some embodiments, one or more of the apertures (or all of the apertures) may be formed on the non-porous planar sheet such that their longitudinal axis, or the longitudinal axes of the fluid passages, are perpendicular to the plane of the non-porous planar sheet. The non-porous planar sheet may be any suitable thickness, such as between 50 microns and about 200 microns.

In some embodiments, microscreen structure 212 may include one or more perforated areas (or portions) 226 that include the plurality of apertures and one or more non-perforated areas (or portions) 228 that do not include (or exclude) the plurality of apertures, as shown in FIG. 7. Apertures 224 are distributed across the entire length and width of only the perforated portion(s). The perforated area(s) may be discrete or spaced from one or more other perforated areas. Apertures 224 may include any suitable pattern(s), shape(s), and/or size(s). In some embodiments, the apertures may be formed with one or more patterns that maximize combined aperture area while maintaining a high enough stiffness of the microscreen structure to prevent excessive deflection under a pressure load. Apertures 224 may be circles (circular), elongated circles (such as shown in FIG. 7), racetrack-shaped or stadium-shaped, ovals, ellipses, hexagons, triangular, square, rectangular, octagons, and/or other suitable shape(s). In some embodiments, apertures 224 in the perforated area(s) may be a single consistent shape, such as shown in FIG. 7. In other embodiments, apertures 224 in the perforated area(s) may be any suitable combination of two or more different shapes, such as two or more of the above shapes.

Apertures 224 may have any suitable orientation(s) and/or be in any suitable pattern(s). For example, apertures 224 may be oriented longitudinally (or along the length of the perforated area(s) or of the planar sheet) and in series in parallel rows. Alternatively, apertures 224 may be oriented laterally (or along the width of the perforated area(s) or of the planar sheet). Additionally, other embodiments of planar sheet 218 may include apertures 224 with two or more directions and/or orientations.

For example, apertures 224 may arranged in a staggered pattern such that the apertures in each row or column are oriented differently from the apertures in each adjacent row or column (e.g., 30, 45, 60, 90, 120 degrees). In one example, apertures 224 also are oriented diagonally and in series in parallel rows such that each row of apertures is oriented about ninety degrees from the adjacent rows of apertures. Alternatively, or additionally, one or more apertures 224 in one or more rows and/or columns may be differently oriented than one or more other apertures in the same rows and/or columns.

The apertures may be any suitable size(s). For example, when the apertures are circles, the diameters may range from about 0.003 inches to about 0.020 inches. Additionally, when the apertures are ovals or ellipses, the radius of the rounded ends of the oval or ellipses may range from 0.001 inches to about 0.010 inches and the length of the oval or ellipses may be up to ten times the radius. Moreover, when the apertures are elongated circles or stadium-shaped, the width or diameter may range from 0.005 inches to 0.02 inches and the length may be from 0.05 inches to over ten times the diameter, such as 0.8 inches.

In some examples, one or more apertures 224 may be sized to span the entire or substantially the entire width or length of the perforated area. For example, stadium-shaped apertures may be oriented transversely and/or may be the entire width or substantially the entire width of the perforated area(s) or portion(s) such that the aspect ratio (length/width) is much larger than 10. An example of dimensions for such apertures are 0.005 inches to 0.02 inches width and length of up to 8 inches. The apertures may be spaced from each other by about 0.006 inches (i.e., width of the non-perforated portion or solid land between adjacent apertures) to provide a total open area of up to about 62.5%.

In some examples, apertures 224 may have a combination of sizes. For example, apertures 224 may be sized such that planar sheet 218 includes rows and/or columns of apertures having (1) a smaller number of apertures having one or more longer lengths and (2) a larger number of apertures having one or more shorter lengths. In some examples, the rows and/or columns with a smaller number of apertures having a longer length alternate with rows and/or columns with a larger number of apertures having a shorter length, such as in a staggered pattern. For example, apertures 224 may be oriented and each row and/or column alternate between two apertures having longer lengths and three apertures having shorter lengths. The lengths of apertures of each row and/or column may be the same or different. An example of dimensions for such apertures are 0.005 inches to 0.02 inches width and length of 0.05 inches to 8 inches. The apertures may be spaced from each other by about 0.006 inches (i.e., width of the non-perforated portion or solid land between adjacent apertures). Other combinations of patterns, sizes, orientation, and/or shapes of apertures 224 are possible and are included in the present disclosure.

The non-porous planar sheet may include any suitable materials. For example, the non-porous planar sheet may include stainless steel. The stainless steel may include 300-series stainless steel (e.g., stainless steel 303 (aluminum modified), stainless steel 304, etc.), 400-series stainless steel, 17-7PH, 14-8 PH, and/or 15-7 PH. In some embodiments, the stainless steel may include about 0.6 weight % to about 3.0 weight % of aluminum. In some embodiments, the non-porous planar sheet may include carbon steel, copper or copper alloys, aluminum or aluminum alloys, nickel, nickel-copper alloys, and/or base metals plated with silver, nickel, and/or copper. The base metals may include carbon steel or one or more of the stainless steels discussed above. Hydrogen-selective membrane 210 may be sized larger than the perforated area or field of the microscreen structure such that a perimeter portion of the hydrogen-selective membrane contacts one or more non-perforated areas 228 of the microscreen structure when the hydrogen-selective membrane is metallurgically bonded to the microscreen structure. In some embodiments, a single hydrogen-selective membrane may be metallurgically bonded to a single microscreen structure, as shown in FIG. 6. In other embodiments, two or more hydrogen-selective membranes 210 may be metallurgically bonded to a single microscreen structure 212. For example, two, three, four, five, six, seven, eight, nine, ten or more hydrogen-selective membranes 210 may be metallurgically bonded to a single microscreen structure 212. When two or more hydrogen-selective membranes 210 are metallurgically bonded to the microscreen structure, the microscreen structure may include two or more discrete perforated areas separated by one or more non-perforated areas 228.

Microscreen structure 212 may be sized to be contained (such as entirely contained) within the open region of the permeate frame and/or supported by the membrane support structure within that open region, as shown in FIG. 6. In other words, the microscreen structure may be sized not to contact the perimeter shell of the permeate frame when the microscreen structure and the permeate frame are secured or compressed to the first and second end frames. Alternatively, the microscreen structure may be supported by and/or secured to a non-porous perimeter wall portion or frame (not shown), such as to the perimeter shell of the permeate frame. When the microscreen structure is secured to a non-porous perimeter wall portion, the microscreen structure may be referred to as a "porous central area portion." Examples of other microscreen structures are disclosed in U.S. Patent Application Publication No. 2010/0064887, the complete disclosure of which is hereby incorporated by reference for all purposes.

In some embodiments, the microscreen structure may be coated with a thin layer of a metal or intermediate bonding layer that aids in the diffusion bonding. For example, a thin coating of nickel, copper, silver, gold, palladium, or other metal that is amenable to solid-state diffusion bonding but does not (1) melt and enter the liquid phase at less than or equal to 700° C. and (2) form a low-melting alloy at less than or equal to 700° C. upon diffusion into the hydrogen-selective membrane(s). The thin metal layer may be applied to the microscreen structure via a suitable deposition process (e.g., electrochemical plating, vapor deposition, sputtering, etc.) of a thin coating of the intermediate bonding layer onto the surface of the microscreen structure that will be in contact with the hydrogen-selective membrane. In some embodiments, foil-microscreen assembly 208 includes only the hydrogen-selective membrane(s) and the microscreen structure(s) (with or without the above coating) and without any other frames, gaskets, components, and/or structures attached, bonded, and/or metallurgically bonded to the either or both of the hydrogen-selective membrane(s) and/or the microscreen structure(s). In other embodiments, the hydrogen-selective membrane(s) may be secured to at least one membrane frame (not shown), which may then be secured to the first and second end frames. Although hydrogen-selective membrane 210 and microscreen structure 212 are discussed to be metallurgically bonded to each other, other examples of foil-microscreen assembly 208 may include a hydrogen-selective membrane 210 and a microscreen structure 212 that are not metallurgically bonded to each other. Additional examples of foil microscreen assemblies 208 are shown in U.S. Patent Application Publication No. 2021/0402349, the complete disclosure of which is hereby incorporated by reference for all purposes.

Hydrogen purification device 196 also may include a plurality of plates or frames 230 disposed between and secured to the first and/or second end frames. The frames may include any suitable structure and/or may be any suitable shape(s), such as square, rectangular, or circular. For example, frames 230 may include a perimeter base or shell 232, as shown in FIG. 6. The perimeter shell may be planar and/or may define an open area or region 234. Additionally, perimeter shell 226 may include first and second opposed sides 238 and 240, and third and fourth opposed sides 242 and 244, as shown in FIG. 6. Moreover, perimeter shell 226 may include at least one input aperture 246 and/or at least one output aperture 248. The input apertures of frames 230 may collectively form at least one input conduit 250 configured to receive at least a portion of the mixed gas stream. Similarly, the output apertures of frames 230 may collectively form at least one output conduit 252 configured to receive at least part of the permeate stream. Although output apertures 248 are shown to extend longitudinally of the perimeter shell and input apertures 246 are shown to extend laterally of the perimeter shell, the output apertures may instead extend laterally and the input apertures may instead extend longitudinally of the perimeter shell.

Figure 8:
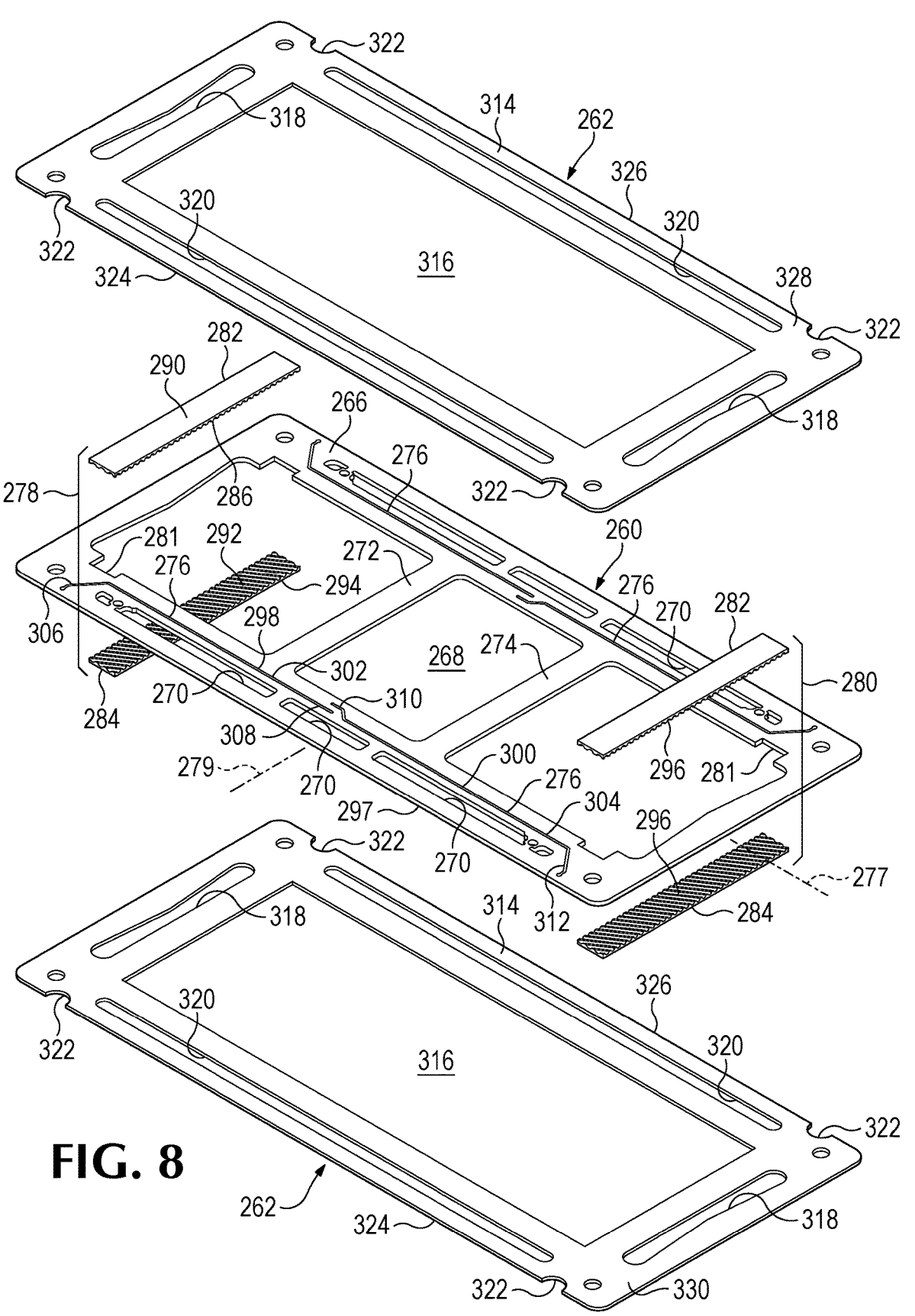
FIG. 8 is a partial view of the hydrogen purification device of FIG. 6, showing an example of a feed frame and gasket frames.

Frames 230 may include at least one feed frame 260, a plurality of gaskets or gasket frames 262, and at least one permeate frame 264, as shown in FIGS. 6-17. Feed frame 260 may be disposed between one of the first and second end frames and at least one foil-microscreen assembly 208, or between two foil-microscreen assemblies 208. The feed frame may include a feed frame perimeter shell 266, a feed frame open region 268 surrounded by the feed frame perimeter shell, at least one feed frame output aperture 270 in the feed frame perimeter shell, a first feed frame support member 272, a second feed frame support member 274, and at least one feed frame leak hole, slot, or aperture 276 in the feed frame perimeter shell, as shown in FIG. 8. Although feed frame 260 is shown to include the first and second feed frame support members, other examples of feed frame 260 may exclude both those support members or include only one of those support members.

Feed frame perimeter shell 266 defines a longitudinal axis 277 and a lateral axis 279 perpendicular to the longitudinal axis. Open region 268 may be fluidly connected and/or may be in fluid communication with input conduit 250. The open region may be distinct and/or spaced from feed frame output aperture 270 and feed frame leak aperture 276. The open region may be configured to receive at least a portion of the mixed gas stream. Feed frame output aperture 270 may form a portion of output conduit 252 with corresponding output apertures of other frames of frames 230. The feed frame output aperture may be spaced and distinct from open region 268.

First and second feed frame support members 272 and 274 may include any suitable structure configured to support foil-microscreen assembly 208, induce mixing (turbulence) in the mixed gas stream, and/or support feed frame perimeter shell 266 from deflecting outward away from feed frame open region 268. The first and second feed frame support members may be spaced and distinct from each and/or may be co-planar with each other. Although the first and second feed frame support members are shown to extend completely across the open region connecting longitudinal sides of the feed frame, other examples of feed frame 260 may include first and/or second feed frame support members that do not extend completely across the open region and/or that extends from the same side or from different sides. The first and second feed frame support members may be the full thickness of the perimeter shell or may be less than the full thickness of that shell.

In the example shown in FIG. 8, feed frame 260 also includes first and second feed frame membrane support assemblies 278 and 280 that are received in notches 281 of feed frame perimeter shell 266. Those notches are in fluid communication with open region 268. In other embodiments, the feed frame may exclude the above notches and the feed frame membrane support assemblies may be attached to the feed frame. Additionally, first and second feed frame membrane support assemblies 278 and 280 provide flow paths for the mixed gas stream. First and second feed frame support members 272 and 274 may be disposed between the first and second membrane support assemblies 278 and 280. However, other examples of feed frame 260 may include other configurations, such as the first and second membrane support assemblies disposed between the first and second feed frame support members. Additionally, other examples of feed frame 260 may include more or less membrane support assemblies. In one example, the feed frame may include three, four, or more membrane support assemblies with or without the feed frame support members. In another example, the feed frame may exclude the membrane support assemblies and include only feed frame support member(s).

Each of the first and second feed frame membrane support assemblies may include a first feed frame membrane support plate 282 and a second feed frame membrane support plate 284, as shown in FIG. 8. The first feed frame membrane support plate may include a first face 286 and a second opposed face 290. Similarly, second feed frame membrane support plate 284 may include a first face 292 and a second opposed face 294. The first face of the first and/or second feed frame membrane support plates may include microgrooves 296. Additionally, the first face of the first and second feed frame membrane support plates may face toward each other. In other words, the first and second membrane support plates may be stacked in the feed frame membrane support assemblies such that the first face of the first feed frame membrane support plate faces and/or contacts the first face of the second feed frame membrane support plate, and/or vice-versa.

Figures 9, 10, 11:
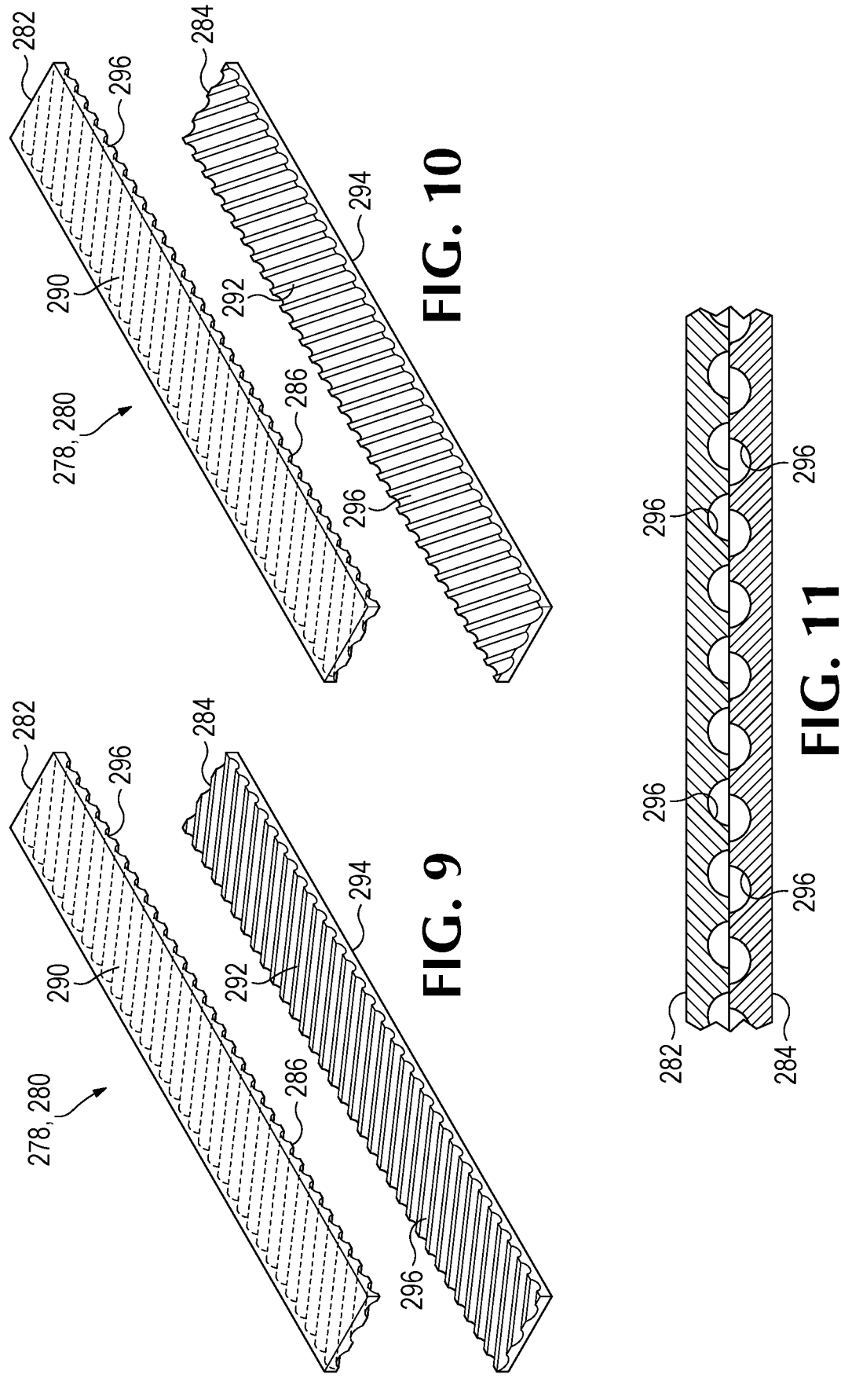
FIG. 9 is an exploded isometric view of an example of opposed inserts for the feed frame of FIG. 8.
FIG. 10 is an exploded isometric view of another example of opposed inserts for the feed frame of FIG. 8.
FIG. 11 is a partial sectional view of the feed frame of FIG. 8 taken along lines 11-11 in FIG. 13, showing an example of flow channels provided by the opposed inserts of FIG. 9 or FIG. 10.

Microgrooves 296 provide and/or promote flow paths for the mixed gas stream received in the open region of the feed frame. In the example shown in FIGS. 9-11, microgrooves 296 are diagonal or oblique relative to the sides of the first and second feed frame membrane support plates. The first and second feed frame membrane support plates may be positioned such that the microgrooves of the first feed frame membrane support plate are substantially parallel or parallel to the microgrooves of the second feed frame membrane support plate, as shown in FIG. 9. Alternatively, the first and second feed frame membrane support plates may be positioned such that the microgrooves of the first feed frame membrane support plate are substantially perpendicular, substantially oblique, or extend across the microgrooves of the second feed frame membrane support plate, as shown in FIG. 10.

Referring back to FIG. 8, feed frame leak aperture 276 may be configured to receive a portion of the mixed gas stream that leaks from the open region and/or from the input conduit, such as across and/or between the interfaces of adjacent frames. The feed frame leak aperture may be distinct and spaced from open region 268 and feed frame output aperture(s) 270, and/or may be disposed between open region 268 and feed frame output aperture(s) 270. When feed frame 260 includes feed frame output apertures 270 on opposed sides of the feed frame, then each of those sides may include at least one feed frame leak aperture 276 disposed between the open region and the feed frame output aperture of that side.

The feed frame leak aperture(s) may at least substantially surround feed frame output aperture(s) 270 to ensure that any mixed gas stream that leaks from, for example, the open region and/or the input conduit, will be received by the feed frame leak aperture and not by the feed frame output aperture(s) and the output conduit. In the example shown in FIG. 8, feed frame leak aperture(s) 276 surrounds feed frame output apertures 270 at least 180 degrees around or along three of the four sides (i.e., two of two lateral sides and one of two longitudinal sides) of the feed frame output apertures with the remaining side not surrounded being closest to or adjacent to the edge of the feed frame. In other examples, the feed frame leak apertures may surround feed frame output apertures more than 180 degrees around the feed frame output aperture(s), such as 200, 220, 250, or 270 degrees. In further examples, the feed frame leak apertures may simply extend beyond the length of the feed frame output apertures without surrounding those apertures. In other words, the feed frame leak apertures may span across and beyond only one side of the feed frame output apertures.

Feed frame leak apertures 276 may be any suitable shape(s) and/or size(s) and/or may terminate at any suitable location of the feed frame. In the example shown in FIG. 8, feed frame leak apertures 276 are elongate and terminate at locations that are spaced from longitudinal edge 297 of the perimeter shell of feed frame 260. In other words, the feed frame leak apertures 276 do not terminate at the longitudinal edge of the perimeter shell of the feed frame to maintain mechanical integrity of the feed frame.

Feed frame 260 may include any suitable number of feed frame leak apertures 276. For example, feed frame 260 may include two or more leak apertures 276 for increased mechanical integrity of the feed frame relative to a single leak aperture 276 having the total length of the two or more leak apertures. When feed frame 260 includes two or more feed frame leak apertures 276 on the same side of the feed frame those apertures may be distinct and spaced from each other and a portion of the feed frame leak apertures may overlap with each other and/or may be shaped to ensure that the leaked mixed gas stream does not flow or escape between the feed frame leak apertures and into the feed frame output aperture(s). In the example shown in FIG. 8, feed frame leak apertures 276 include a first feed frame leak aperture 298 and a second feed frame leak aperture 300 spaced and distinct from the first feed frame leak aperture. A substantial portion 302 of first feed frame leak aperture 298 may be co-linear with a substantial portion 304 of second feed frame leak aperture 300.

First feed frame leak aperture 298 may include opposed longitudinal end portions 306 and 308, while second feed frame leak aperture 300 may include opposed longitudinal end portions 310 and 312. End portion 306 and end portion 312 may wrap around feed frame output apertures 270 and may be fluidly connected or in fluid communication with notches of the gasket frames (as further discussed below). Additionally, end portion 310 may wrap around and/or may overlap with end portion 308 to minimize leaked mixed gas from flowing between the first and second feed frame leak apertures, such as minimizing the flow of leaked mixed gas from flowing parallel to the lateral axis of the perimeter shell. In other words, end portion 310 may be co-axial with end portion 308 along a plurality of lateral axes that are perpendicular to the longitudinal axis of the feed frame perimeter shell. End portion 310 may be spaced from end portion 308 for increased mechanical integrity of the feed frame.

Feed frame leak apertures 276 may be formed via any suitable method(s). For example, metal etching may be used to form those apertures. In metal etching, a mask is applied to a suitable pie of sheet metal to protect certain areas from chemical attack by the etching fluid. Generally, etching fluid is applied to both surfaces of the metal at the same time, thereby causing etching to occur at nearly the same rate from both opposing sides. As a result, the etching is only slightly more than halfway through the thickness of the material, which translates to etching all the way through the thickness of the metal. Etching typically results in features that are at least 1.5 times the depth of etching. Other suitable methods for forming the feed frame leak apertures include laser cutting and milling. The feed frame leak apertures may sometimes be referred to as "feed frame weep channels."

Gasket frames 262 may include any suitable structure configured to provide a mechanical seal between two or more adjacent frames and/or components. For example, each gasket frame may include a perimeter base or shell 314, an open area or region 316 surrounded by the perimeter base, at least one gasket input aperture 318 in the perimeter base, at least one gasket output aperture 320 in the perimeter base, and at least one notch 322 in the perimeter base, as shown in FIG. 8. Open area 316 may be fluidly connected and/or may be in fluid communication with open region 268 of the feed frame. The open area may be distinct and spaced from gasket input aperture(s) 318 and gasket output aperture(s) 320. Gasket input aperture(s) 318 may be spaced and distinct from open area 316 and output aperture(s) 310. The gasket input aperture(s) form a portion of input conduit 250 with corresponding input apertures of other frames of frames 230.

Figure 12:
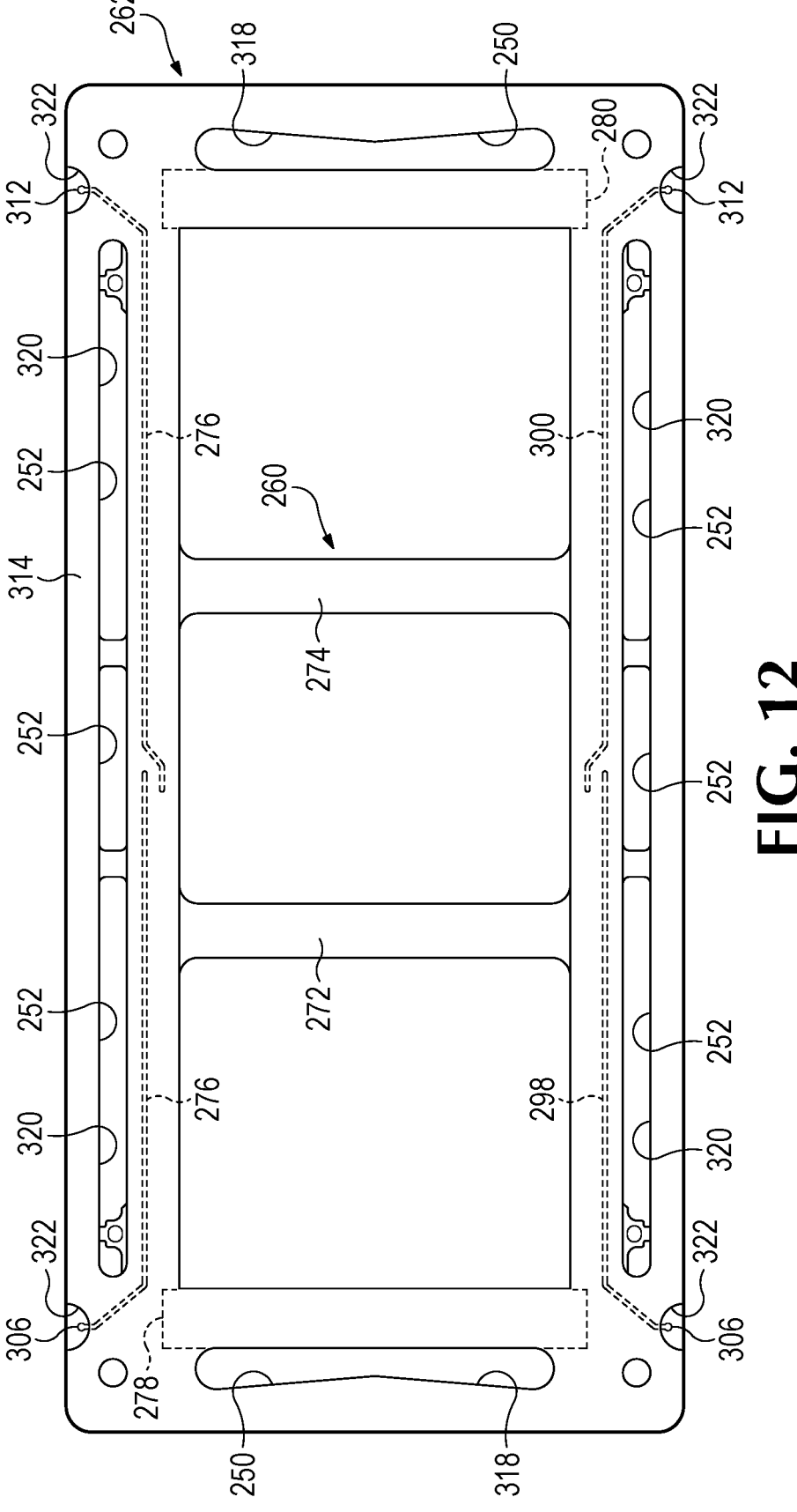
FIG. 12 is a top view of the feed frame and gasket frames of FIG. 8.

Gasket output aperture(s) 320 may be spaced and distinct from open area 316 and input aperture(s) 318. The gasket output aperture(s) may form a portion of output conduit 252 with corresponding output apertures of other frames of frames 320. Notch(es) 322 may be in or along opposed longitudinal edges 324, 326 of perimeter base 314. In other words, unlike the feed frame leak apertures, notch(es) 322 may terminate in the opposed longitudinal edges of the perimeter base. Notch(es) 322 may be fluidly connected or may be in fluid communication with end portions 306 and 312 of the first and second leak feed frame apertures, as shown in FIG. 12. The location of the notches on the edges of the feed frame allows leaked mixed gas to escape frames 230 and to be collected within the interior space between the frames and the first and second side plates for flowing through the leak ports of those side plates. Hydrogen purification device 196 includes any suitable number of gasket frames 262 and those frames may be disposed between the foil-microscreen assembly, the feed frame(s), and/or the permeate frame. In the example shown in FIGS. 6-7, each feed frame 260 is disposed between a first gasket frame 328 and a second gasket frame 330. Other examples of hydrogen purification device 196 may include more or less gasket frames 262.

Figure 13:
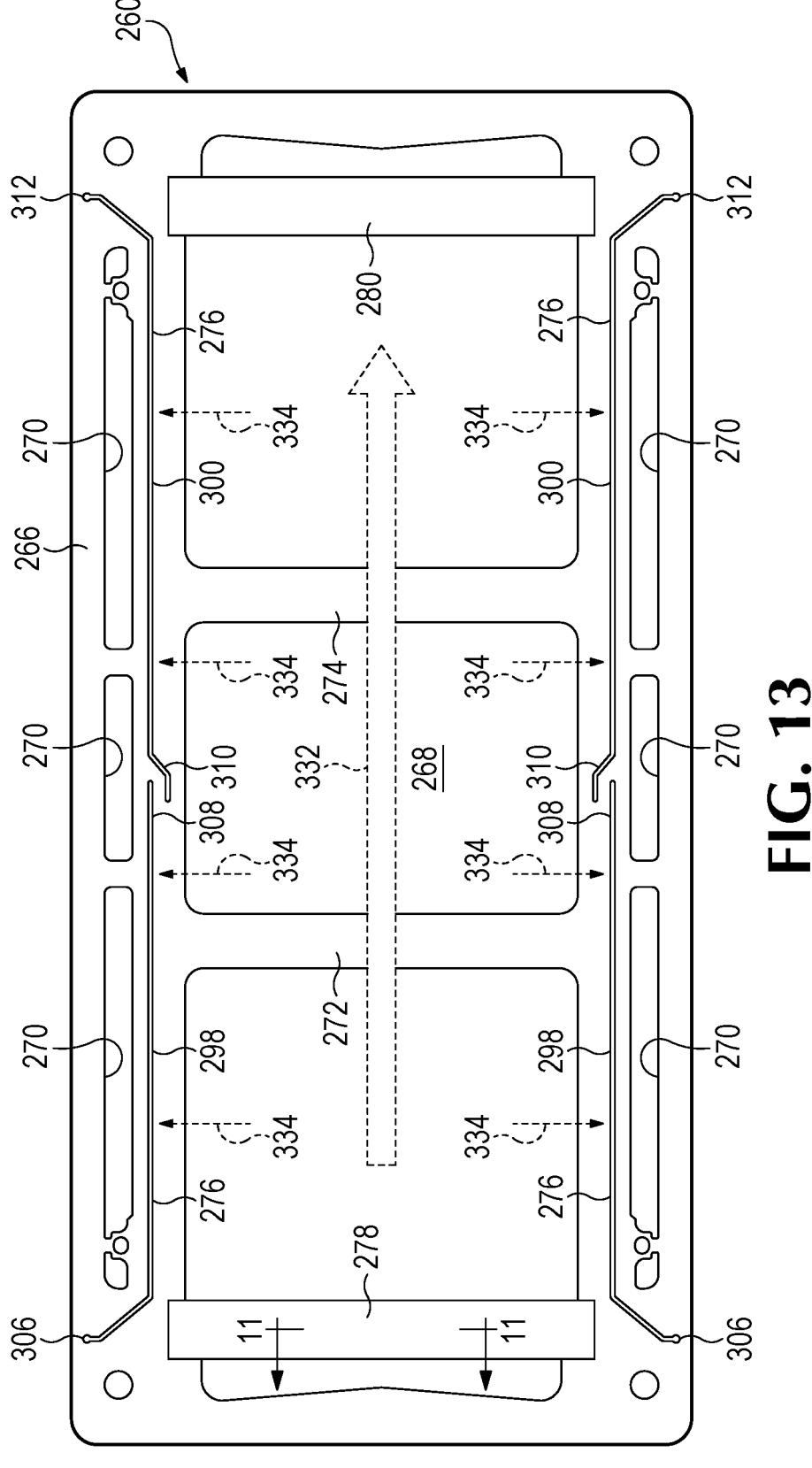
FIG. 13 is a top view of the feed frame of FIG. 8 showing an example of flow direction of the mixed gas stream and flow direction of any leaks of that mixed gas stream.

In operation, the mixed gas stream generally flows across the open region of the feed frame as shown at 332 in FIG. 13. Any deviation of the above general flow, such as leaks between the feed frame and an adjacent gasket frame, should at least substantially flow at 334 to the feed frame leak apertures (instead of into the feed frame output apertures and the output conduit) and out of the frames through notches 322 of the gasket frames. Any leaked gases will accumulate in the interior space between the frames and the first and second side plates until those gases are removed through leak port 214 of one or both the first and second side plates.

Figure 14:
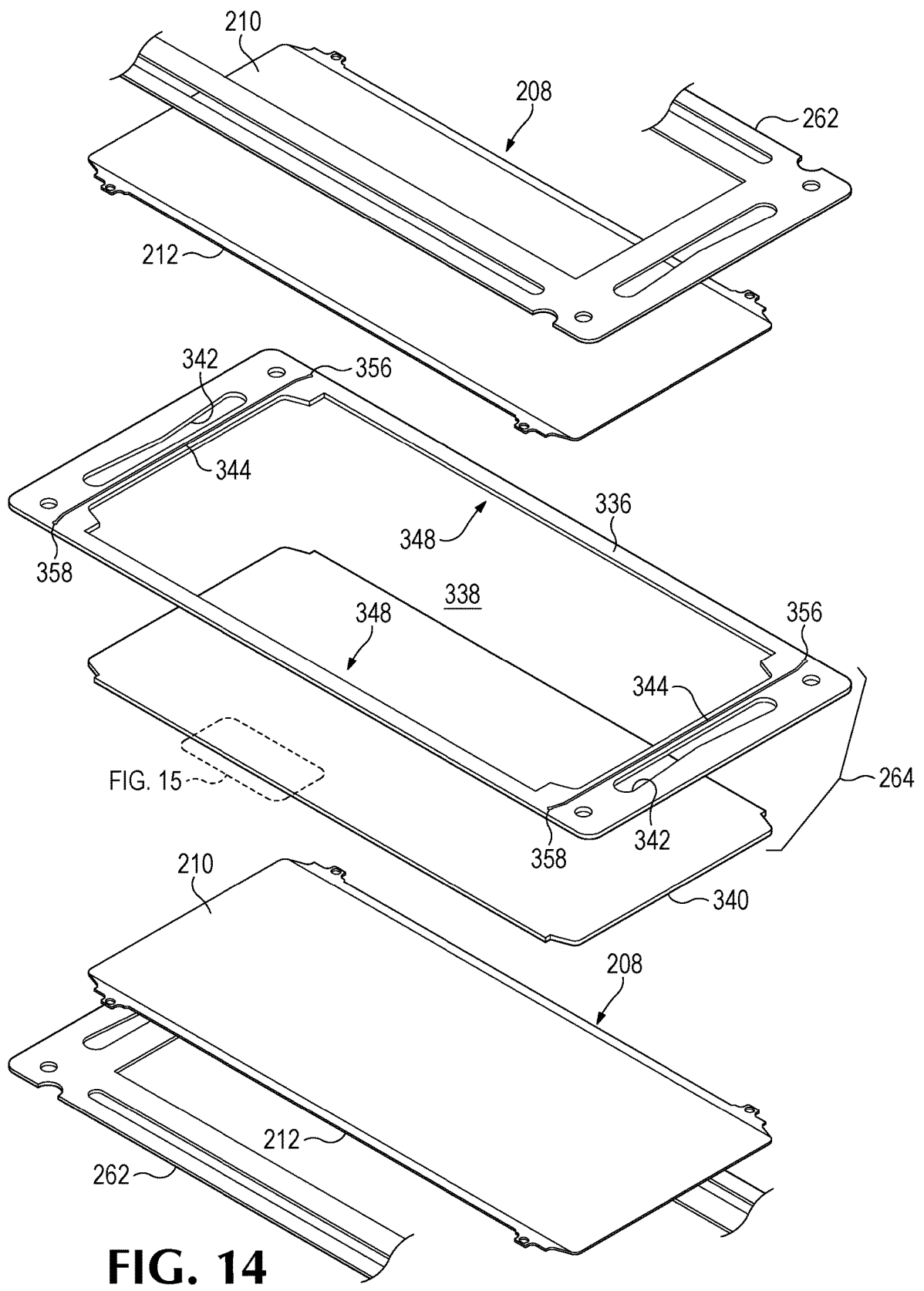
FIG. 14 is a partial view of the hydrogen purification device of FIG. 6, showing an example of a permeate frame, foil-microscreen assemblies, and gasket frames.
Figure 15:
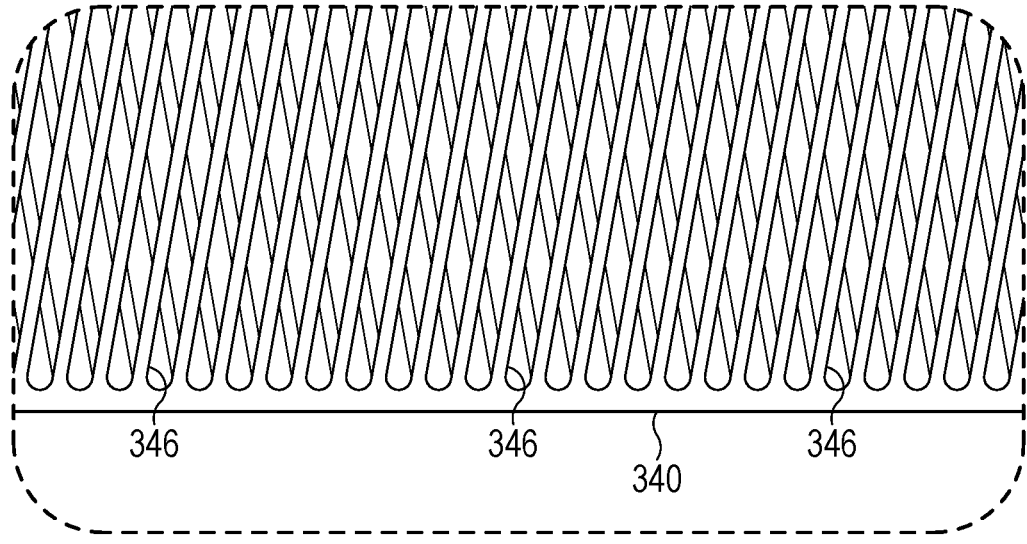
FIG. 15 is a partial view of an example of a support plate of the permeate frame of FIG. 14.

Permeate frame 264 may be disposed between foil-microscreen assemblies 208, as shown in FIGS. 6 and 14. The permeate frame may include a permeate frame perimeter shell 336, a permeate frame open region 338 surrounded by the permeate frame perimeter shell, a permeate frame membrane support plate 340 received in and spanning a substantial portion of the permeate frame open region, at least one permeate frame input aperture 342 in the permeate frame perimeter shell, and at least one permeate frame leak hole, slot, or aperture 344 in the permeate frame perimeter shell, as shown in FIG. 14. Permeate frame membrane support plate 340 may configured to contact and/or support foil-microscreen assemblies 208. The permeate frame membrane support plate may include a plurality of holes 346, such as shown in FIG. 15. Alternatively, permeate frame membrane support plate 340 may include surface grooves that span from one edge to an opposite edge, such as shown in U.S. Pat. No. 11,141,692, the complete disclosure of which is hereby incorporated by reference for all purposes.

Figure 17:
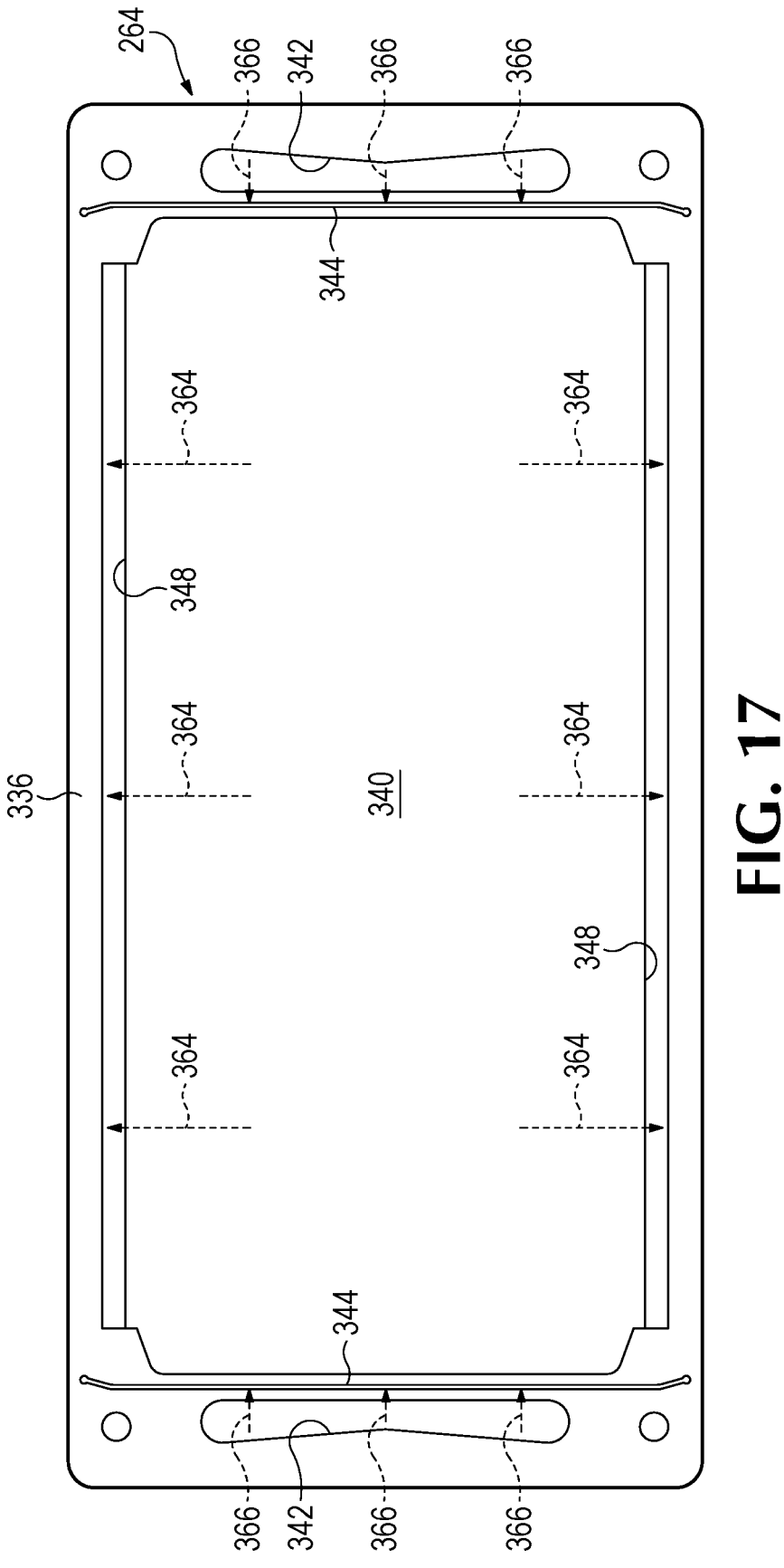
FIG. 17 is a top view of the permeate frame of FIG. 14 showing an example of flow direction of the permeate stream and flow direction of any leaks from the mixed gas stream.

Permeate frame perimeter shell 336 and permeate frame membrane support plate 340 may define at least one permeate frame output aperture 348 therebetween, as shown in FIG. 17. In other words, the permeate frame membrane support plate may be sized to provide one or more gaps between the permeate frame membrane support plate and the permeate frame perimeter shell, which define the permeate frame output aperture(s). The permeate frame output aperture(s) may form a portion of output conduit(s) 252 with corresponding output apertures of other frames of frames 230. The permeate frame output aperture(s) may be spaced and distinct from permeate frame input aperture(s) 342 and permeate frame leak aperture(s) 344.

Permeate frame input aperture(s) 342 may be spaced and distinct from permeate frame open region 338, permeate frame leak aperture(s) 344, and permeate frame output aperture(s) 348. The permeate frame input aperture(s) may form a portion of input conduit(s) 250 with corresponding input apertures of other frames of frames 230. Permeate frame leak aperture(s) 344 may be configured to receive a portion of the mixed gas stream that leaks from the permeate frame open region and/or from the input conduit, such as across and/or between the interfaces of adjacent frames. The permeate frame leak aperture(s) may be distinct and spaced from permeate frame open region 338, permeate frame input aperture(s) 342, and permeate frame output aperture(s) 348, and/or may be disposed between permeate frame open region 338 and permeate frame input aperture(s) 342. The permeate frame leak aperture(s) may at least substantially surround, or completely surround or enclose, permeate frame input aperture(s) 342 to ensure that any mixed gas stream that leaks from, for example, the input conduit, will be received by the permeate frame leak aperture and not by the permeate frame output aperture(s). In the example shown in FIG. 13, permeate frame leak aperture(s) 344 surround one side of permeate frame input aperture(s) 342 of the permeate frame input apertures. In other examples, the permeate frame leak apertures may surround the permeate frame input apertures by 180 degrees or more, such as 200, 220, 250, or 270 degrees.

Permeate frame leak apertures 344 may be any suitable shape(s) and/or size(s) and/or may terminate at any suitable location(s) of the perimeter shell of the permeate frame. In the example shown in FIG. 13, permeate frame leak apertures 344 are elongate and terminate at locations that are spaced from longitudinal edge 350 of the perimeter shell of permeate frame 264. In other words, permeate frame leak apertures 344 do not terminate at the longitudinal edge of the perimeter shell of the permeate frame to maintain mechanical integrity of the permeate frame. The permeate frame leak apertures may sometimes be referred to as "permeate frame weep channels."

Permeate frame 264 may include any suitable number of permeate frame leak apertures 344. In the example shown in FIG. 14, permeate frame 264 includes a single permeate frame leak aperture 344 for each permeate frame input aperture 342.

Figure 16:
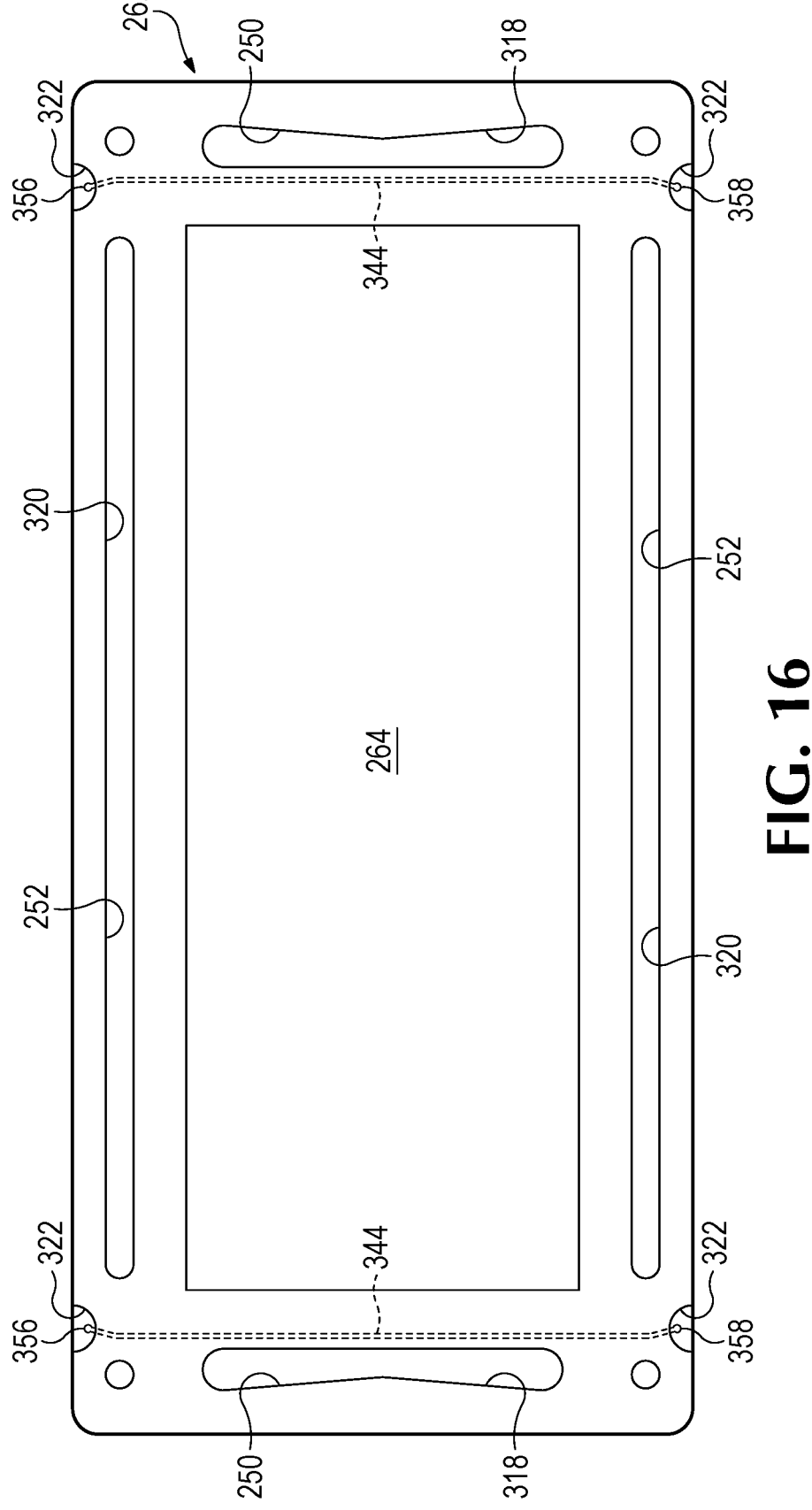
FIG. 16 is a top view of the permeate frame, foil-microscreen assemblies and gasket frames of FIG. 14.

However, other examples of permeate frame 264 may include two or more permeate frame leak apertures 344 per side or permeate frame input aperture 342. When permeate frame 264 includes two or more permeate frame leak apertures 344 per permeate frame input aperture 342, a portion of the permeate frame leak apertures may overlap with each other and/or may be shaped to ensure that the leaked mixed gas stream does not flow or escape between the leak apertures and into the permeate frame output aperture(s). Permeate frame leak aperture 352 may include opposed longitudinal end portions 356 and 358, which may be fluidly connected or in fluid communication with notches 322 of the gasket frames, as shown in FIG. 16. Permeate frame leak apertures 352 may be formed via any suitable methods, such as via etching, laser cutting, and milling as discussed above for the feed frame leak apertures.

In operation, the permeate stream generally flows transversely across permeate frame membrane support plate 340 toward opposed permeate frame output apertures 348 of the permeate frame as shown at 364 in FIG. 17. If there are any leaks of the mixed gas stream from permeate frame input aperture(s) 342, such as leaks between the permeate frame and one or more adjacent components, those leaks will at least substantially flow at 366 to the permeate frame leak apertures (instead of flowing into permeate frame output apertures 348) and out of the frames through notches 322 of the gasket frames and into the interior space between the frames and the first and second side plates for removal through the leak port of one or both of the first and second side plates.

In some embodiments, the end plates, the foil-microscreen assemblies, and frames 224 may be secured or compressed together, such as mechanically secured and/or mechanically compressed via bolts and/or other fasteners, without any metallurgical bonding and/or other types of chemical bonding between two or more components of the hydrogen purification device (other than the above described metallurgical bonding between the hydrogen-selective membrane and the coated or uncoated microscreen structure within the foil-microscreen assembly(ies)). For example, there may be no gaskets and/or frames metallurgically or otherwise chemically bonded to the hydrogen-selective membrane(s) and/or the microscreen structure(s) of the foil-microscreen assembly(ies) and to all other components of the hydrogen purification device.

INDUSTRIAL APPLICABILITY

The present disclosure, including hydrogen purification devices and components of those devices, is applicable to the fuel processing and other industries in which hydrogen gas is purified, produced, and/or utilized.

The disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where any claim recites "a" or "a first" element or the equivalent thereof, such claim should be understood to include incorporation of one or more such elements, neither requiring nor excluding two or more such elements.

Inventions embodied in various combinations and subcombinations of features, functions, elements, and/or properties may be claimed through presentation of new claims in a related application. Such new claims, whether they are directed to a different invention or directed to the same invention, whether different, broader, narrower or equal in scope to the original claims, are also regarded as included within the subject matter of the inventions of the present disclosure.

What is claimed is:

1. A hydrogen purification device, comprising:
   first and second end frames including:
      an input port capable of receiving a mixed gas stream containing hydrogen gas and other gases;
      an output port capable of receiving a permeate stream containing at least one of a greater concentration of hydrogen gas and a lower concentration of the other gases than the mixed gas stream; and
      a byproduct port capable of receiving a byproduct stream containing at least a substantial portion of the other gases;
   at least one hydrogen-selective membrane disposed between and secured to the first and second end frames, the at least one hydrogen-selective membrane having a feed side and a permeate side, at least part of the permeate stream being formed from the portion of the mixed gas stream that passes from the feed side to the permeate side, with the remaining portion of the mixed gas stream, which remains on the feed side, forming at least part of the byproduct stream; and
   a plurality of frames disposed between the first and second end frames and the at least one hydrogen-selective membrane and secured to the first and second end frames, the plurality of frames including a feed frame disposed between the at least one hydrogen-selective membrane and one of the first and second end frames, the feed frame including:
      a planar perimeter shell,
      an open region surrounded by the perimeter shell, the open region being in fluid communication with input apertures of other frames of the plurality of frames, the input apertures collectively forming at least one input conduit, and the open region and the at least one input conduit capable of receiving at least a portion of the mixed gas stream,
      at least one output aperture in the perimeter shell, the at least one output aperture being distinct and spaced from the open region and forming at least one output conduit with corresponding output apertures of other frames of the plurality of frames, and the at least one output conduit capable of receiving at least part of the permeate stream, and
      at least one elongate hole distinct and spaced from the open region and the at least one output aperture, the at least one elongate hole being disposed between the open region and the at least one output aperture, and the at least one elongate hole being capable of receiving a portion of the mixed gas stream that leaks from the open region or the at least one input conduit.

2. The device of claim 1, wherein the plurality of frames includes first and second gasket frames, the feed frame being disposed between the first and second gasket frames, each of the first and second gasket frames including:
   a planar perimeter base,
   an open area surrounded by the perimeter base,
   at least one input aperture in the perimeter base, the at least one input aperture being distinct and spaced from the open area, and the at least one input aperture forming a portion of the at least one input conduit,
   at least one output aperture in the perimeter base, the at least one output aperture being distinct and spaced from the open area and the at least one input aperture, and the at least one output aperture forming a portion of the at least one output conduit with the at least one output aperture of the feed frame, and at least one notch in one or more edges of the perimeter base, the at least one notch being distinct and spaced from the open area, the at least one input aperture, and the at least one output aperture, and the at least one notch being in fluid communication with a longitudinal end portion of the at least one elongate hole of the feed frame.

3. The device of claim 2, wherein the plurality of frames further includes a permeate frame, the at least one hydrogen-selective membrane being disposed between the permeate frame and the feed frame, the permeate frame including:

a planar perimeter shell, an open region surrounded by the perimeter shell, a support plate received in and spanning a substantial portion of the open region, the support plate being in contact with and supporting the at least one hydrogen selective membrane, the support plate and the perimeter shell defining at least one output aperture therebetween, and the at least one output aperture forming a portion of the at least one output conduit with the at least one output aperture of the feed frame and with the at least one output aperture of the first and second gasket frames, at least one input aperture in the perimeter shell, the at least one input aperture being distinct and spaced from the open region and the at least one output aperture, and the at least one input aperture forming a portion of the at least one input conduit with the input apertures of the first and second gasket frames, and at least one elongate hole distinct and spaced from the open region, the least one output aperture, and the at least one input aperture, the at least one elongate hole being disposed between the open region and the at least one input aperture, and the at least one elongate hole being capable of receiving a portion of the mixed gas stream that leaks from the at least one input conduit.

4. The device of claim 3, wherein the at least one notch of the first and second gasket frames is in fluid communication with a longitudinal end portion of the at least one elongate hole of the permeate frame.

5. The device of claim 4, wherein the at least one elongate hole of the feed frame extends longitudinally along the perimeter shell of the feed frame, and wherein the at least one elongate hole of the permeate frame extends laterally along the perimeter shell of the permeate frame.

6. The device of claim 1, wherein the plurality of frames further includes a permeate frame, the at least one hydrogen-selective membrane being disposed between the permeate frame and the feed frame, the permeate frame including:

a planar perimeter shell, an open region surrounded by the perimeter shell, a support plate received in and spanning a substantial portion of the open region, the support plate being in contact with and supporting the at least one hydrogen selective membrane, the support plate and the perimeter shell defining at least one output aperture therebetween, and the at least one output aperture forming a portion of the at least one output conduit with the at least one output aperture of the feed frame, at least one input aperture in the perimeter shell, the at least one input aperture being distinct and spaced from the open region and the at least one output aperture, and the at least one input aperture forming a portion of the at least one input conduit, and at least one elongate hole distinct and spaced from the open region, the least one output aperture, and the at least one input aperture, the at least one elongate hole being disposed between the open region and the at least one input aperture, the at least one elongate hole being capable of receiving a portion of the mixed gas stream that leaks from the at least one input conduit.

7. The device of claim 1, further comprising opposed side plates attached to each other and to the first and second end frames, wherein the opposed side plates and the first and second end frames collectively enclose the plurality of frames.

8. The device of claim 7, wherein at least one side plate of the opposed side plates includes a mixed gas port capable of receiving the portion of the mixed gas stream that leaks from at least one of the open region of the feed frame and the at least one input conduit.

9. The device of claim 7, wherein each of the opposed side plates includes an elongate base member having opposed longitudinal ends, and a side member attached to, or formed with, each of the opposed longitudinal ends.

10. The device of claim 9, wherein each side member is perpendicularly attached to, or formed with, a corresponding longitudinal end of the opposed longitudinal ends.

11. The device of claim 1, wherein the perimeter shell of the feed frame includes opposed notches in fluid communication with the open region, further comprising at least one membrane support plate having opposed longitudinal end portions received in the opposed notches.

12. The device of claim 11, wherein the at least one membrane support plate includes first and second membrane support plates, each of the first and second membrane support plates having a first face having a plurality of grooves capable of providing flow channels for at least a portion of the mixed gas stream, and a second face opposed the first face, wherein the first and second membrane support plates are stacked such that the first face of the first membrane support plate faces the first face of the second membrane support plate.

13. The device of claim 1, wherein the at least one elongate hole of the feed frame spans at least 180 degrees around the at least one output aperture of the feed frame.

14. The device of claim 1, wherein the at least one elongate hole of the feed frame is spaced from the edges of the perimeter shell of the feed frame.

15. The device of claim 1, wherein the at least one elongate hole of the feed frame does not terminate at an edge of the perimeter shell of the feed frame.

16. The device of claim 1, wherein the at least one elongate hole of the feed frame includes a first elongate hole and a second elongate hole spaced and distinct and spaced from the first elongate hole.

17. The device of claim 16, wherein a substantial portion of the first elongate hole is co-linear with a substantial portion of the second elongate hole.

18. The device of claim 16, where the perimeter shell of the feed frame defines a longitudinal axis, wherein an end portion of the second elongate hole is co-axial with an end portion of the first elongate hole along a plurality of lateral axes that are perpendicular to the longitudinal axis.

19. The device of claim 1, further comprising at least one microscreen structure having a plurality of microscreen apertures, wherein the at least one hydrogen-selective membrane is metallurgically bonded to the at least one microscreen structure.

\* \* \* \* \*